US006532024B1

United States Patent
Everett et al.

(10) Patent No.: US 6,532,024 B1
(45) Date of Patent: *Mar. 11, 2003

(54) MULTI-FORMAT ON-SCREEN MONITOR

(75) Inventors: Mark J. Everett, Pottstown, PA (US); Richard R. Hollowbush, Fleetwood, PA (US); Randy A. Mauger, Douglassville, PA (US)

(73) Assignee: Videotek, Inc., Pottstown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,371

(22) Filed: Mar. 31, 2000

Related U.S. Application Data

(63) Continuation-in-part of application No. 08/950,451, filed on Oct. 15, 1997, now Pat. No. 6,069,607.

(51) Int. Cl.$^7$ ............................................... G06T 11/20
(52) U.S. Cl. ........................................ 345/716; 345/440
(58) Field of Search ............................ 345/660, 440.1, 345/440, 440.02, 716–718; 348/185

(56) References Cited

U.S. PATENT DOCUMENTS

| | | | |
|---|---|---|---|
| 4,811,097 A | 3/1989 | Ritter et al. ................. 358/160 |
| 5,046,030 A | 9/1991 | Bitter et al. ............ 364/571.02 |
| 5,097,257 A | 3/1992 | Clough et al. ............... 340/814 |
| 5,122,863 A | 6/1992 | Zortea ......................... 358/10 |
| 5,166,779 A | 11/1992 | Moyer .......................... 358/10 |
| 5,166,791 A | 11/1992 | Crawford ..................... 358/10 |
| 5,231,475 A | 7/1993 | Ritter et al. .................. 358/22 |
| 5,469,188 A | 11/1995 | Krishnamurthy et al. ... 345/117 |
| 5,473,382 A | 12/1995 | Nohmi et al. ............... 348/448 |
| 5,537,157 A | 7/1996 | Washino et al. ............ 348/722 |
| 5,553,140 A | 9/1996 | Kubota et al. ................ 380/10 |
| 5,737,032 A | 4/1998 | Stenzel et al. .............. 348/649 |
| 5,856,930 A | 1/1999 | Hosono ....................... 364/514 |
| 5,926,228 A | 7/1999 | Jeon et al. ................... 348/554 |

FOREIGN PATENT DOCUMENTS

| | | |
|---|---|---|
| EP | 0 336 594 A3 | 10/1989 |
| GB | 2 183 420 A | 6/1987 |

OTHER PUBLICATIONS

Videotek, Inc., Brochure for Television Signal Monitor, Videotek VTM–100, 1994, 4 pages.
MAGNI MM–400 Brochure, 1993.
MAGNI WVM–710A/720 Brochure, Nov. 1995.
http://www.chinatenders.com/com/example/jinci/ifba.htm-.(Mar. 26, 1997) See item 2–1–4: "PAL waveform and vector monitor".
http://www.videotek.com/test.html. (Sep. 16, 1998). See whole document.
http://www.tek.com, Tektronix, Inc., 9 pages, Apr. 25, 1998, Published Specifications for WVR500 Waveform/Vector Rasterizer.

(List continued on next page.)

*Primary Examiner*—Amare Mengistu
(74) *Attorney, Agent, or Firm*—Duane Morris LLP

(57) ABSTRACT

An audio-video signal processor for use with a standard non-interlaced computer monitor has at least one video input for receiving an analog or digital input signal. The signal processor generates a resized non-interlaced video image, graphic video waveform, Lissajous (audio phase) and vector diagram based on the video input signal. Analog and digital stereo audio is also processed, and preferably multiple channel (i.e., 5.1 or 7.1) bar graphs including audio level and phase data are displayed based on the audio input signal. The signal processor simultaneously displays the resized non-interlaced video image, graphic video waveform, vector diagram, Lissajous (audio phase) and audio graphic display in progressive scan format, each in a portion of the standard non-interlaced computer monitor (e.g., SVGA, XGA . . . ).

10 Claims, 19 Drawing Sheets

OTHER PUBLICATIONS

Videotek, Inc., Brochure for Digital Video Signal Monitor VTM–100D, 1995, 4 pages.

James Grunder & Associates, Inc., Hamlet Brochure, 4 pages, Published Jun. 18, 1997.

http://www:accesschina.com Access China Business, web page, 5 pages, Mar. 27, 1997.

http://www.tek.com, Tektronix, Inc., 9 pages, Apr. 25, 1998, Published Specifications for WVR500 Waveform/Vector Rasterrer.

Videotek, Inc., Brochure for Digital Video Signal Monitor VTM–100D, 1995, 4 pages.

James Grunder & Associates, Inc., Hamlet Brochure, 4 pages, Published Jun. 18, 1997.

MULTI-FORMAT ON-SCREEN MONITOR

This application is a continuation-in-part of application Ser. No. 08/950,451, filed Oct. 15, 1997, now issued as U.S. Pat. No. 6,069,607.

BACKGROUND OF THE INVENTION

1. Field of the Invention

The invention relates to the field of video and audio signal monitoring and test equipment, and in particular concerns a signal processor with analog composite video inputs, serial digital video inputs (compliant with ITU-R BT.601 SMPTE 259M standards at 270 Mb/s, 50 Hz and 60 Hz field rates, also called CCIR 601) as well as stereo analog audio inputs. The signal processor is operable selectively and/or simultaneously to display video images, graphic video waveform information, graphic vector data and audio information, including audio phase and multi-channel audio signals, in high resolution form. The invention is useful in connection with audio and graphics production, mixed format and video production and post production facilities, and can replace multiple pieces of test equipment such as waveform monitors, vectorscopes, audio test sets and various format video monitors.

2. Description of the Related Art

Standard video signals are generally displayed on either television sets or composite video monitors in color or black and white. For color, the standard color composite video signal is an analog signal that electrically represents the brightness or luminance, saturation and color hue or chrominance of a complete video picture or frame, divided into sequential individual picture elements (pixels) of a raster scanned display. A pixel is the smallest discrete area of a television or video picture, each including adjacent red, blue and green phosphors. In addition, the signal includes synchronizing information associated with controlling raster scanning, such as blanking and maintaining the correct phase relationship between the signal and deflection of the electron beam for scanning accurately over the respective colored parts of the successive pixels.

Monitors compliant with various video standards such as NTSC, PAL and SECAM are available and display a video image in an interlaced format having specific timing. For example, an NTSC compliant composite video signal is displayed with 525 lines per frame at 30 frames per second. Each frame is composed of two interlaced fields of 262.5 lines completed at a field rate of 59.94 Hz.

Three basic types of synchronizing information are contained in the signal, namely horizontal sync pulses at the line rate, vertical sync pulses at field rate and a color burst during horizontal blanking. The color burst typically controls a phase locked loop and provides a frequency and phase reference for correctly decoding the color information by illuminating the correct colored phosphors with the cathode ray electron beam at the correct time.

Video production equipment advantageously includes various forms of video and audio signal monitoring and measurement equipment useful to verify the integrity of the signal being processed, for example for adjusting equipment to certain standards when processing a test pattern or for generally monitoring characteristics of the program. The composite graphic video waveform can be viewed graphically, for example, using an oscilloscope triggered by the horizontal sync to provide a two dimensional representation of the video signal in Cartesian coordinates (X axis—time, Y axis—amplitude) when processing a test pattern having vertical color bars. Alternatively a modified oscilloscope with specific time bases and amplitude scales is used.

The color content of the video signal is represented by phase relationship to the subcarrier synchronized to the color burst. Accordingly, color information is advantageously displayed graphically in a polar plot using a vectorscope. A vectorscope is generally a specialized, oscilloscope operable to display a Lissajous pattern in which both the X and Y axis of the display represent luminance information (e.g., red minus luminance plotted against blue minus luminance). The vectorscope is useful in setting or monitoring timing, phase and amplitude parameters of a video signal to match standard color test patterns.

Typical stereo and/or mono audio information which accompanies a television video signal is generally displayed on moving needle galvanometers or LED bar displays with scales calibrated in dB. Multi-channel "surround sound" audio information advantageously displayed with multiple bar displays with scales calibrated in dB. For example, the Tektronix AV601 provides AES/EBU Digital Audio Monitoring capabilities including Audio Level, Phase and Time Code Displays.

Test instruments such as the Videotek VTM-100, VTM-100D and the Tektronix WVR500 provide for the simultaneous display of video image information, waveform, vector and audio graphic display information in interlaced format on an NTSC or PAL monitor. The use of standard interlaced displays for simultaneous display of such information severely limits the clarity and detail of the video images, rasterized waveforms, vectorscope and audio graphic display information.

It would be desirable to provide a simple and efficient means to display NTSC. PAL, SECAM and High Definition (i.e., as specified in SMPTE 292M) video images, waveforms, vectorscope and audio graphic display information with increased clarity and detail, and preferably selectively and simultaneously.

SUMMARY OF THE INVENTION

The present invention is directed to an audio-video signal processor with two analog composite video inputs, two serial digital video inputs (compliant with ITU-R BT.601 and SMPTE 259M standards at 270 Mb/s, 50 Hz and 60 HZ field rates) as well as two stereo analog or digital audio inputs. The processor controls simultaneously display of video images, waveform, vector and audio information in high resolution form, each in a quadrant of standard computer monitor.

In another inventive aspect of the present invention is directed to an audio-video signal processor having dual serial digital inputs (e.g., 720p, 1080i, and 1080p/24sf serial digital input formats), an audio graphic display for 5.1 or 7.1 channels of input audio display and monitoring, XGA (1024×768) output, a display aspect ratio of either 4:3 or 16:9, A-B parade/overlay inputs (synchronous and same format) and filters, Timecode input (LTC and VANC) with on screen display, Analog, AES/EBU and embedded audio inputs with analog monitoring, 8 Analog, AES/EBU and embedded audio inputs and associated displays. The processor controls simultaneously display of video images, waveform, vector and audio information (audio phase and improved multiple channel audio graphic displays) in high resolution form, each in a quadrant of standard computer monitor.

The invention is useful in connection with graphics, mixed format and video production and post production facilities including broadcasting, and serves all the functions of waveform monitors, vectorscopes, various types of audio test sets and standard video monitors, providing substantial cost reduction and increased convenience.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The invention comprises a signal processor with analog video inputs for analog video input signals in both NTSC and PAL formats, serial digital video inputs for serial digital input signals, as well as analog and digital audio inputs for standard analog and AES/EBU digital audio input signals. The serial digital video inputs are compliant with ITU-R BT.601 (formerly known as CCIR 601) and SMPTE 259M standards which define the sampling systems, matrix values, and filter characteristics for both Y, B-Y, R-Y and RGB component digital television. The signal processor also has additional control inputs for computer control of various functions via a standard RS-232 serial port and GPI/TALLY connector. The signal processor is operable to process the audio and video input signals and simultaneously display video images, waveform, vector and audio information in high resolution form, each in a quadrant of standard SVGA computer monitor in 800×600 pixel resolution.

Figure 1:
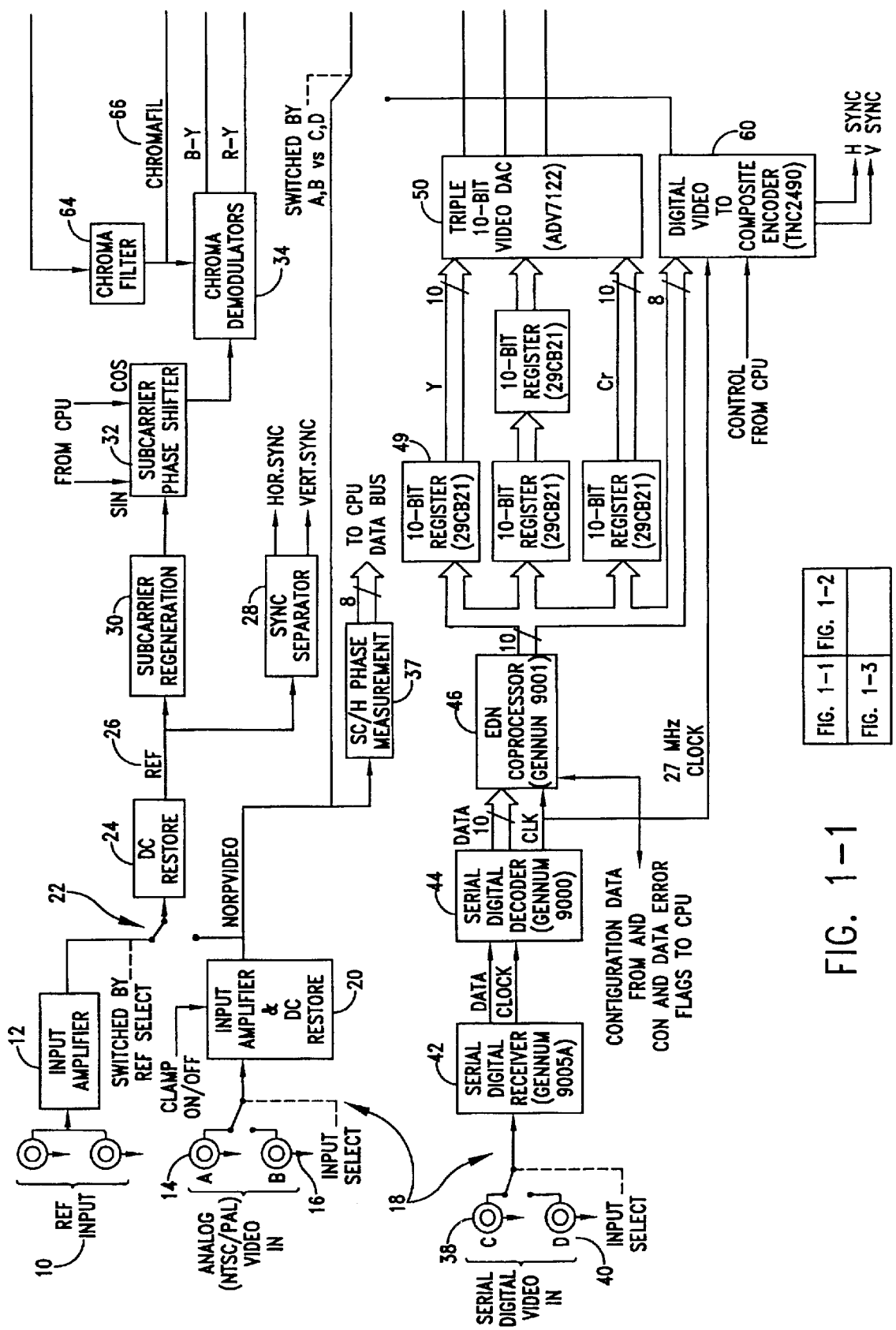
FIG. 1 is block diagram of the video input circuitry in accordance with the invention.

FIG. 1 is a block diagram illustrating circuitry for the analog and digital inputs for receiving analog and digital video input signals, respectively. The analog and/or video input signals are processed to extract a horizontal sync signal and a vertical sync signal. These sync signals are utilized by the signal processor for the generation of various timing signals. For analog video inputs, red minus luminance (R-Y), blue minus luminance (B-Y), composite video (VIDORCAL) and CHROMAFIL signals are produced for use as source signals for generation of waveform or vector display. For digital video inputs Y, Cb, Cr, R, G, B, R-Y, B-Y, composite video (VIDORCAL) and CHROMAFIL signals are produced for use as source signals for generation of waveform or vector display.

Analog REF input 10 is coupled to input amplifier 12. One of analog NTSC/PAL input A, 14, and analog NTSC/PAL input B, 16, are selected by the input select switch 18 which is user controllable via the front panel (not shown). The selected analog NTSC or PAL input is coupled to input amplifier/DC restore circuit 20 which is operable to DC restore based on the state of the clamp on/off signal which also originates from user controllable front panel controls (not shown). Thus, the selected NTSC/PAL input signal is DC restored under user control.

The REF select switch 22 selects the between the REF input and one of analog NTSC/PAL inputs A and B for subsequent processing into horizontal sync, vertical sync, red minus luminance and blue minus luminance signals. The selected REF signal is coupled to DC restore circuit 24 and accordingly is always DC restored. The DC restored REF output 26 is routed to sync separator 28 for generation of horizontal sync and vertical sync signals and to subcarrier regeneration circuit 30, subcarrier phase shifter 32 and chroma demodulator 34 for generation of red minus luminance (R-Y) and blue minus luminance (B-Y) signals which are subsequently amplified as shown by block 36.

The analog video input signal as selected by input select switch 18 is also routed to SC/H phase measurement circuit 37 for measurement of subcarrier to horizontal phase relationship. The output of the SC/H phase measurement circuit 37 is coupled to the microprocessor (FIG. 3) for subsequent processing and/or display. For NTSC video, SC/H represents the phase relationship of the subcarrier to the leading edge of horizontal sync. SC/H phase is correct when the zero crossing of subcarrier is aligned with the 50% point of the leading edge of sync. For PAL video signal, SC/H phase is defined as the phase of the EU component of the color burst extrapolated to the half amplitude point of the leading edge of synchronizing pulse of line 1 of field 1.

One of serial digital video input C, 38, and serial digital input D, 40, are also selected by input select switch 18. The selected serial digital video input signal used to generate horizontal sync and vertical sync signals for generation of subsequent timing signals. Y Cb Cr signals from which RGB, gamut error signals, red minus luminance and blue minus luminance as well as the composite video signals are derived, are used as input signals for the generation of waveform and/or vector display.

The selected serial digital input is coupled to a serial digital receiver 42 which locks to the serial data stream and generates separate data and clock signals which are routed to a serial digital decoder 44 and EDH coprocessor 46. The EDH coprocessor detects EDH and data errors and communicates these to the CPU (FIG. 3). The 10-bit parallel output of the EDH coprocessor is separated by 4 10-bit registers. The digital register outputs are converted into analog Y Cb CR format via triple 10-bit digital to analog converter 50. The Y Cb Cr format signal is input to filters 52 and to YCbCr-to-RGB transcoder 54, which converts the Y Cb Cr signal to RGB. The Y Cb Cr and RGB signals are subsequently amplified as shown by block 36. The RGB signal is input to a Gamut error detection circuit which produces a Gamut error signal 58, which is coupled to the microprocessor (FIG. 3) for subsequent processing and/or display.

The EDH coprocessor output is also routed to a digital video to composite encoder 60 which generates horizontal and vertical sync signals as well as a composite video signal. The input select switch selects between composite video originating from analog video inputs A or B and digital video inputs C or D and the resulting composite video signal is shown on FIG. 1 by reference number 62. Composite video signal 62 is also input to a chroma filter (bandpass filter, Fsc=3.58 mhz-NTSC, 4.43 mhz-PAL) for generation of the CHROMAFIL signal which is also input to amplifier block 36.

For purposes of calibration the CAL pulse calibration signal 68 is provided and can be switched in place of the composite video signal by calibration switch 70. The VIDORCAL signal 72 is output from the calibration switch and represents composite video from one of the analog or digital video inputs, depending on the state of the input select switch, or the CAL pulse calibration signal. The resultant VIDORCAL 72 signal is input to amplifier block 36.

For analog video inputs, the R-Y, B-Y, composite video (VIDORCAL) and CHROMAFIL signals are available on the output of amplifier block 36 for use as source signals for generation of a waveform or vector display. For digital video inputs the Y, Cb, Cr, R, G, B, R-Y, B-Y, composite video (VIDORCAL) and CHROMAFIL signals are available on the output of amplifier block 36 for use as source signals for generation of a waveform or vector display.

The waveform source switch 74 selects between the Y Cb Cr R G B VIDORCAL and CHROMAFIL source signals for subsequent waveform display as the signal Y (Y axis). The vector source switch 78 selects between the Cr, Cb signals and the R-Y, B-Y signals for subsequent vector display as the signals X (76) and Y (78) (X and Y axis). Lowpass filter 82, 2.5× amplifier 84 and attenuators 86, 88 adjust the source signals under user control via front panel switches (not shown).

FIG. 1 also shows 10 bit A/D converters 90 and 92 for analog to digital conversion of the X and Y signals 76, 78 respectively. Offset circuits 94 and 96 provide an offset adjustment of the X and Y signals under user control via front panel switches (not shown). The digital output of A/D converters further processed into waveform and vector display as set out in detail below.

Figures 1, 2:
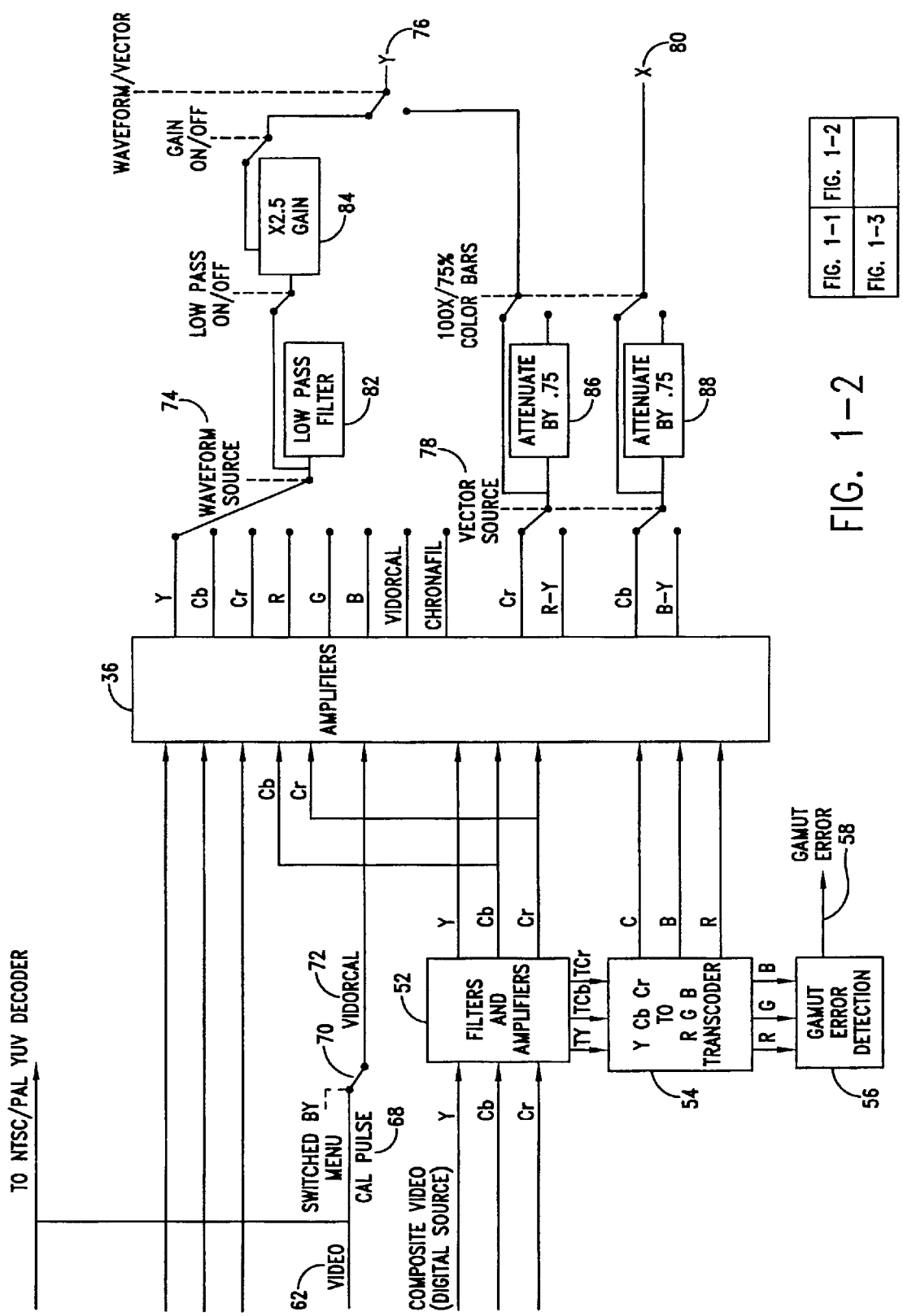
FIG. 2 is a block diagram of circuitry for generating and outputting a non-interlaced video image in accordance with the invention.
Figures 1, 2, 3:
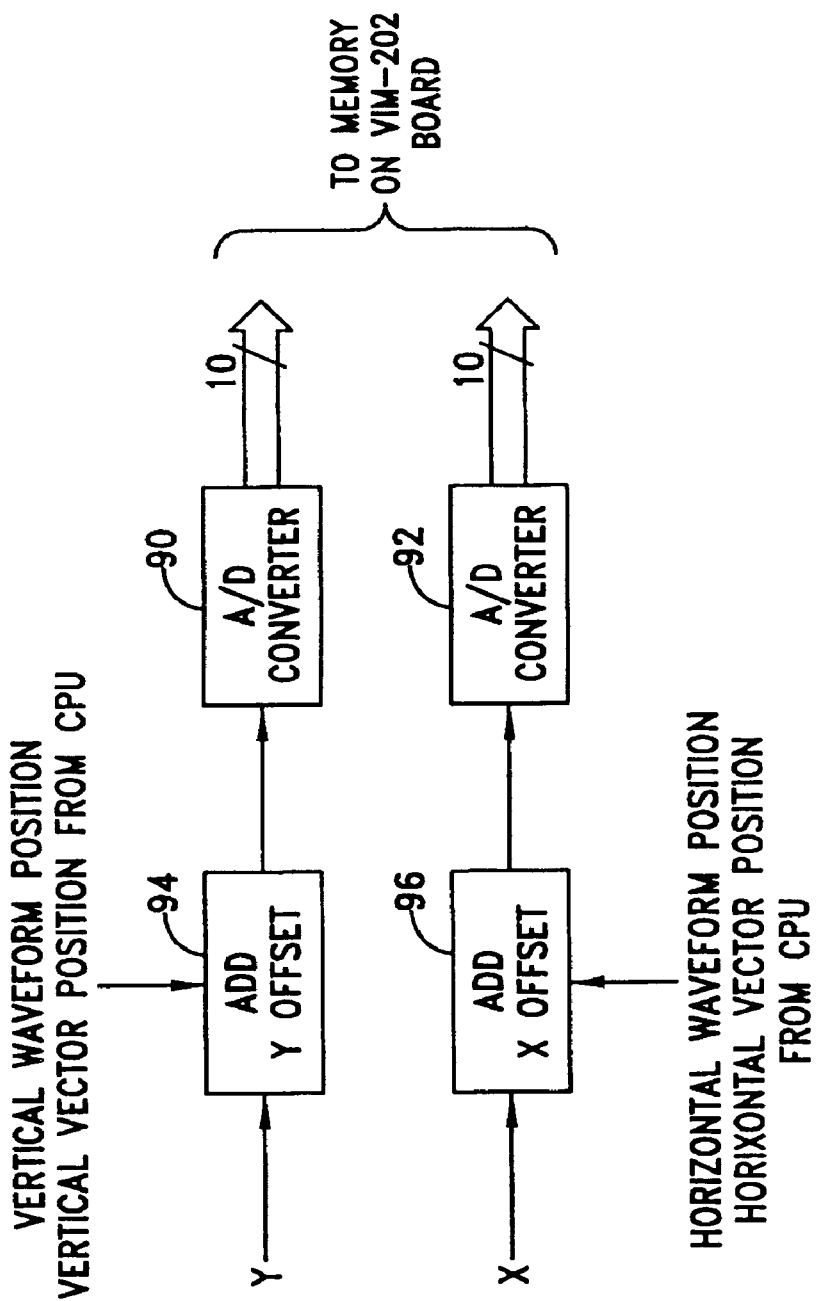
FIG. 3 is a block diagram of a dual RAM bank, waveform sweep generator, dedicated digital processor and associated circuitry in accordance with the invention

FIG. 2 shows a block diagram of the circuitry for converting composite video signal 62 (interlaced) into a non-interlaced video image (either a full screen image or a rasterized video image), as well as the circuitry for outputting a non-interlaced video image in accordance with the invention. Composite video signal 62 is input to a NTSC/PAL-to-YUV decoder 98 (NTSC/PAL to Digital Components) which digitizes the signal and produces parallel digital Y and time multiplexed UV outputs along with associated timing and control signals. The output of the NTSC/PAL-to-YUV decoder 98 is coupled to a video line doubler 100 and associated 256Kx8 memory chips which convert the YUV signals from interlaced to non-interlaced format (progressive scan). The output of the video line doubler 100 is 8 bit parallel data representing red, green and blue portions of the video image in RGB format.

The output of the video line doubler 100 is input to a resizing engine 102 which produces individual picture elements (pixels) for display on a non-interlaced video monitor. Each pixel is consists of an R, G and B value each being 8-bits in size (24-bit color) which allows for 224 possible colors. Each color pixel data is stored in one of two RAM buffers (Red—104 and 110, Green—106 and 112, Blue 108—114) which are controlled by 17-bit counters 116 and 118. Timing signals for 17-bit counters 116 and 118 are provided by a phase locked loop 120 which is synchronized to the analog or digital video input signal as selected.

The outputs of the RAM buffers 104–114 are coupled to octal registers 122–132 which feed triple D/A converter 134. The output of triple D/A converter 134 is filtered and clamped as shown by block 136 to produce a non-interlaced video image 138 in RGB format. The non interlaced video image 138 is resized by the resizing engine for display in one quadrant of a standard SVGA monitor at 800×600 resolution. In the alternative, the output of the video line doubler is coupled directly to the triple D/A converter 134 for generating a full screen video image as shown by dotted line 140, when so selected by the user.

FIG. 2 also shows the block diagram of the phased locked loop 120 which generates several of the timing signals used in conjunction with the display of video images, waveform, vector and audio information in accordance with the invention. First and second voltage controlled oscillators (VCOs) are provided for generating an accurate clock signal synchronized to the selected input. The first VCO 142 is used for NTSC or digital 525/60 operation, and the second VCO 144 is used for PAL or digital 625/50 operation. One of the VCOs is selected for use depending on the type of video input signal that has been selected. The selected VCO becomes part of the phase locked loop having a timing PLD 146 and a phase comparator and filter circuit 148. The output of the selected VCO is counted down and is locked to horizontal sync (HS). The synchronized pixelclk signal becomes the timing source for various circuitry in accordance with the invention including the VGA horizontal and vertical sync signals (vgahsync and vgavsync), and pictime, which determines where on the display the picture appears.

FIG. 3 shows the block diagram of the circuitry for generation of waveform, vector and audio graphic display information such as a bar graph as well as graticule and menu information for display on the VGA monitor as controlled by a microcontroller system having a microprocessor 150 with associated ROM, RAM, control circuitry for generating control signals, data and address busses and CPU image RAM interface 152. The status of the front panel controls 154 are input to the microprocessor 150 though I/O ports or the like. The microprocessor is coupled to front panel indicators 156 so that the front panel indicators can be controlled by the microprocessor.

The final image that the circuitry shown in FIG. 3 generates is the result of two sources. The first source consists of two RAM banks which store information pertaining to the waveform and vector signals based on the data received from 10 bit A/D converters 92 and 90 (digitized X and Y signals) as shown in FIG. 1. The second source consists of a third RAM bank which stores CPU generated image data such as screen text, graticules and an audio graphic display.

Data from 10 bit A/D converters 92 and 90 (digitized X and Y signals) is input to latches 160 and 158 respectively. The digitized Y signal is input to vertical lookup table 162 and the resulting table output is stored in RAM Bank 1 (164). Horizontal and vertical sync signals are input to programmable waveform sweep generator 166 which has first and second outputs 168 and 170. Multiplexer 172 having first and second inputs 174 and 176 is provided to switch between the digital X signal and the first output of the programmable waveform sweep generator 168. The digitized X signal from latch 160 is coupled to multiplexer input 174. The first output of the programmable sweep generator 168 is coupled to the second multiplexer input 176. Multiplexer output 178 is input to horizontal lookup table 180 and the resulting table output is stored in RAM Bank 2 (182). The second output of the programmable sweep generator 170 is coupled to a sample clock phase shifter 184 and the resulting output sample clock signal is coupled to the PAUNTSC input of the phase locked look shown in FIG. 2.

The vgavsync and vgahsync signals and the pixelclk signals from the phase locked loop are input to VGA pixel counter and VGA line counter 186 and 188 respectively. The outputs of the VGA pixel counter and VGA line counter are coupled to the CPU image RAM interface 152 and first and second RAM banks 164 and 182.

The output of first and second RAM banks 164 and 182 are output to multiplexer 190. The output of the CPU image RAM interface 152 and the output of multiplexer 190 are coupled to RAMDAC 192 which produces analog image information 194 in RGB (progressive scan) format.

Figures 1, 2:
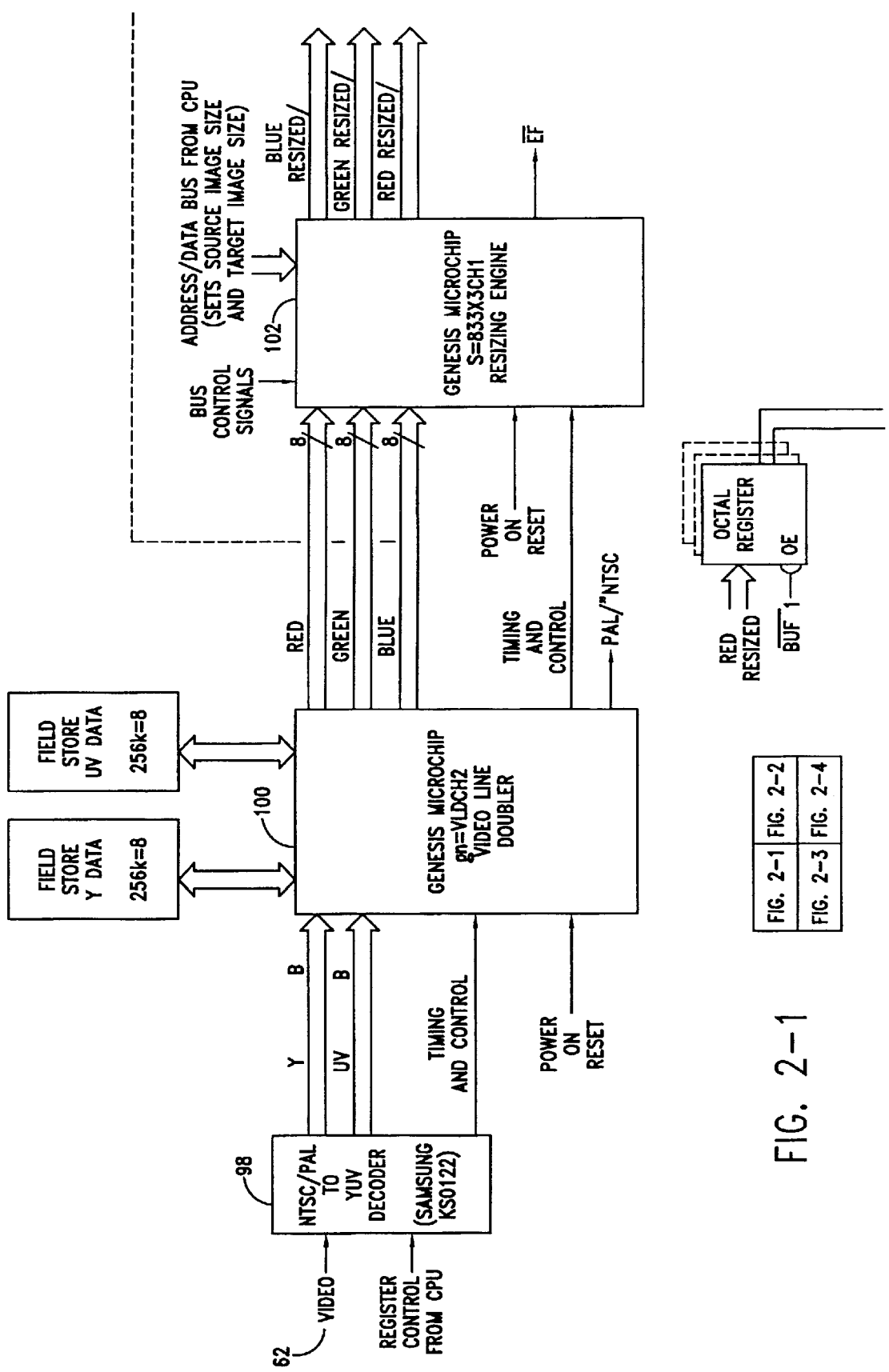
Figure 2:
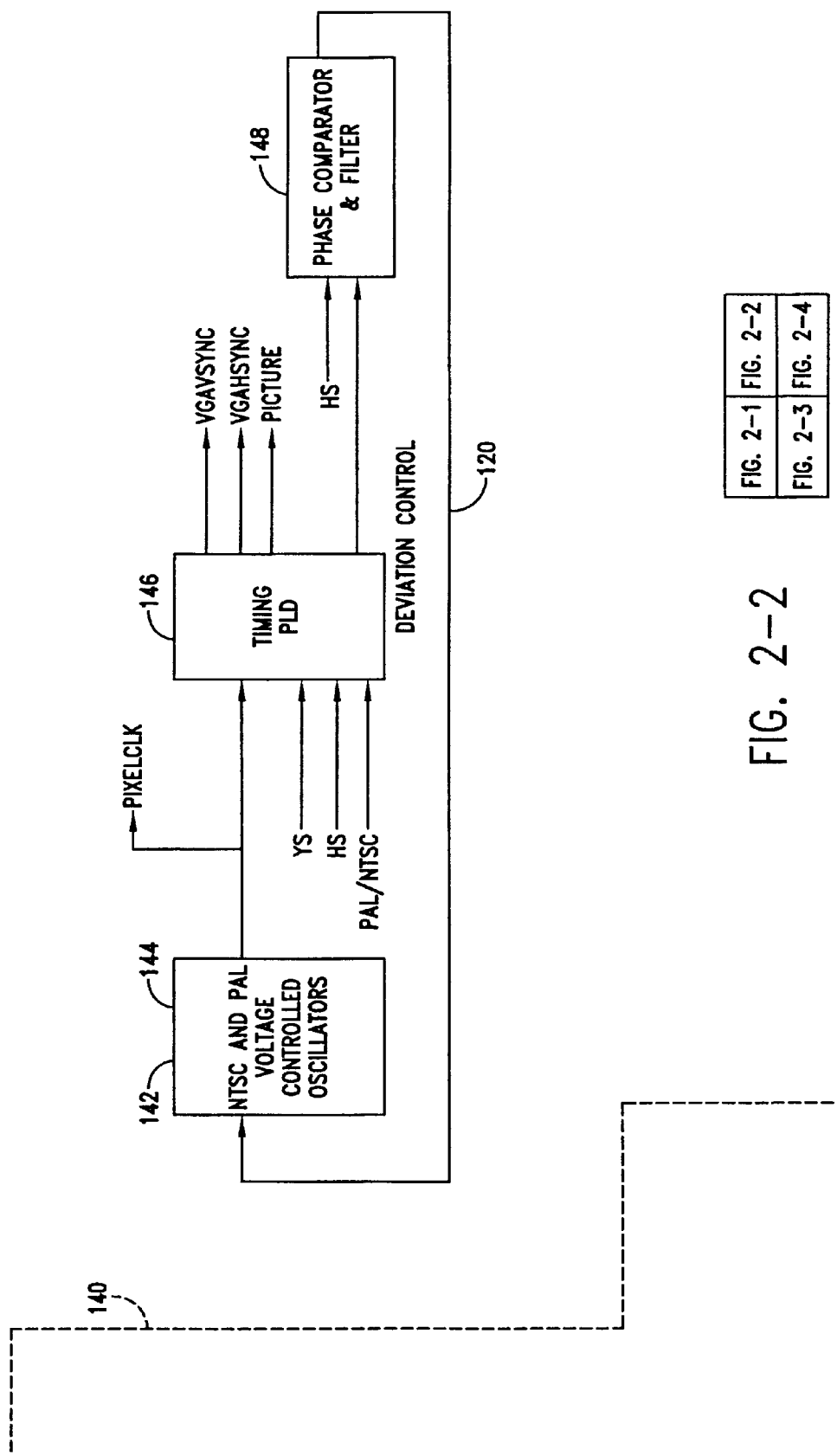
Figures 2, 3:
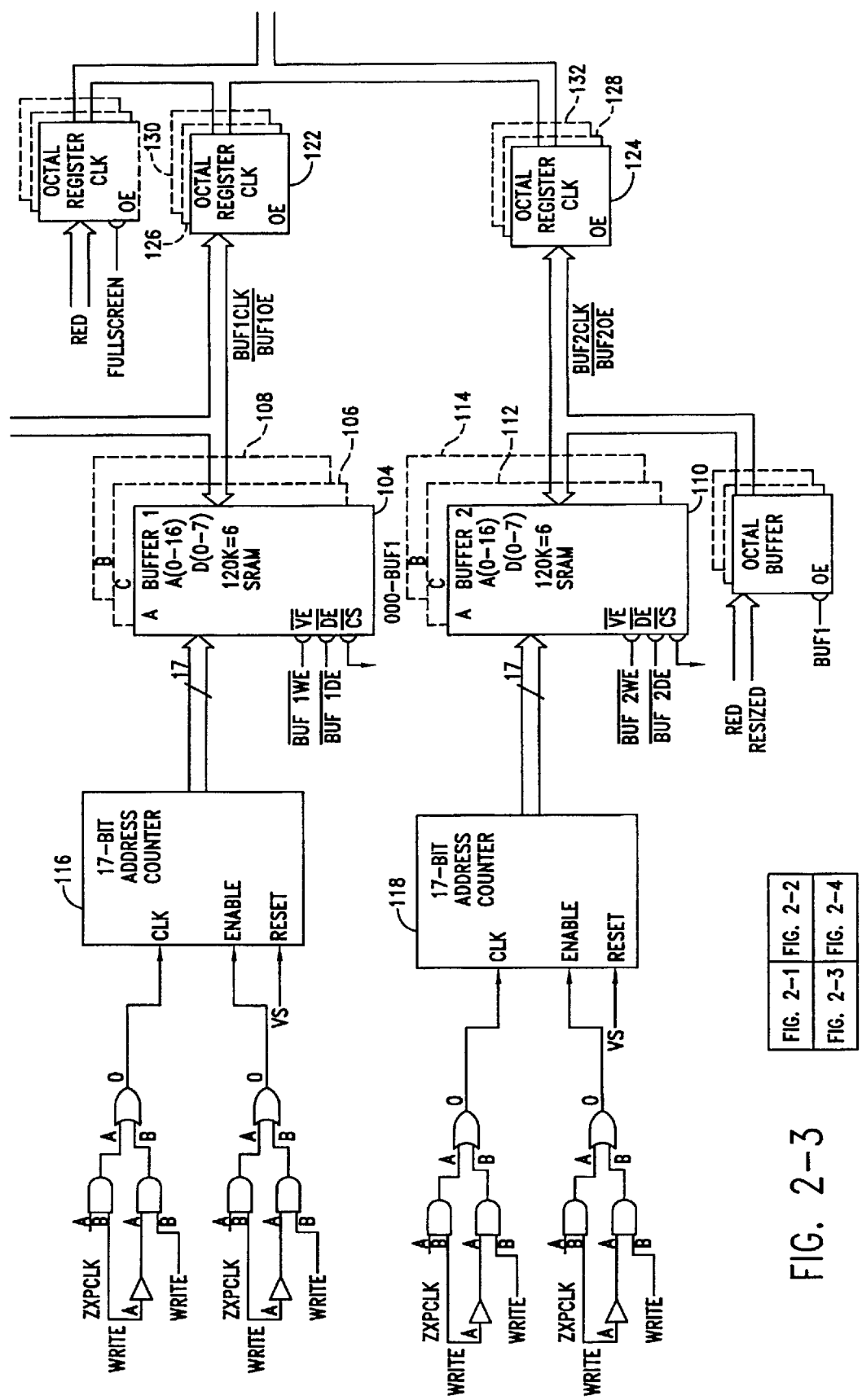
Figures 2, 3, 4:
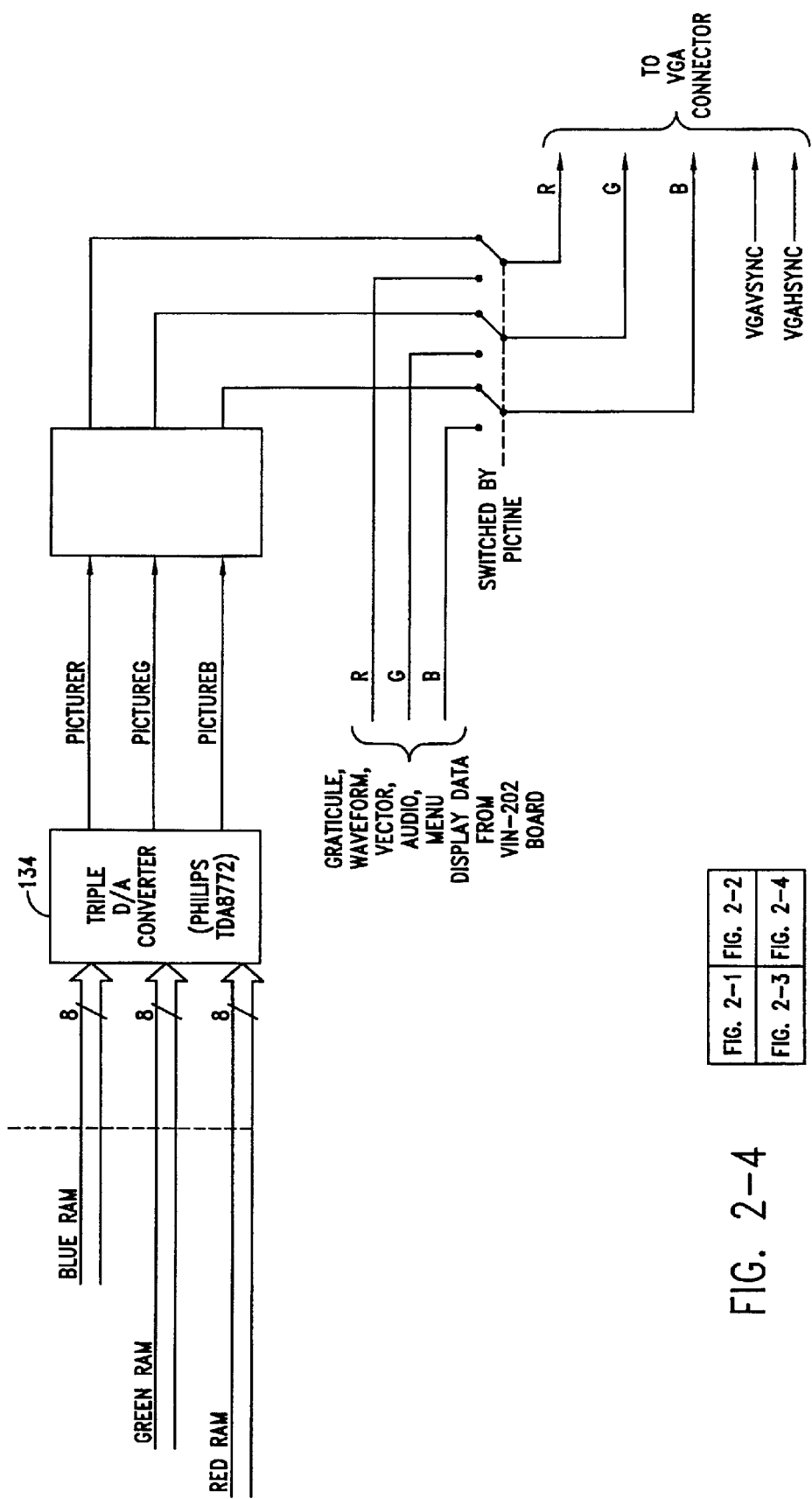
FIG. 4 is a block diagram of the audio input circuitry, peak detector and phase detector in accordance with the invention.
Figure 3:
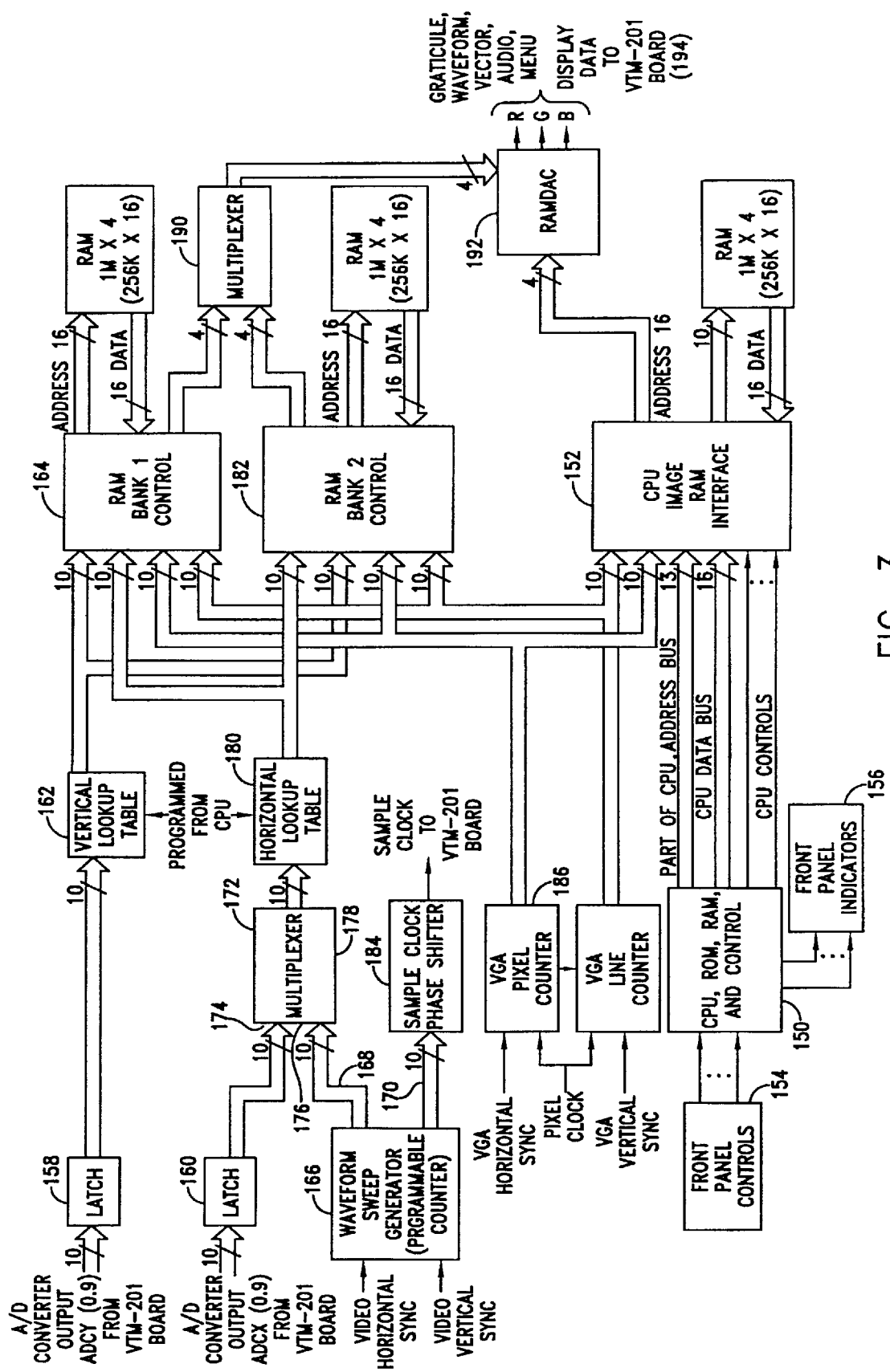
Figure 4:
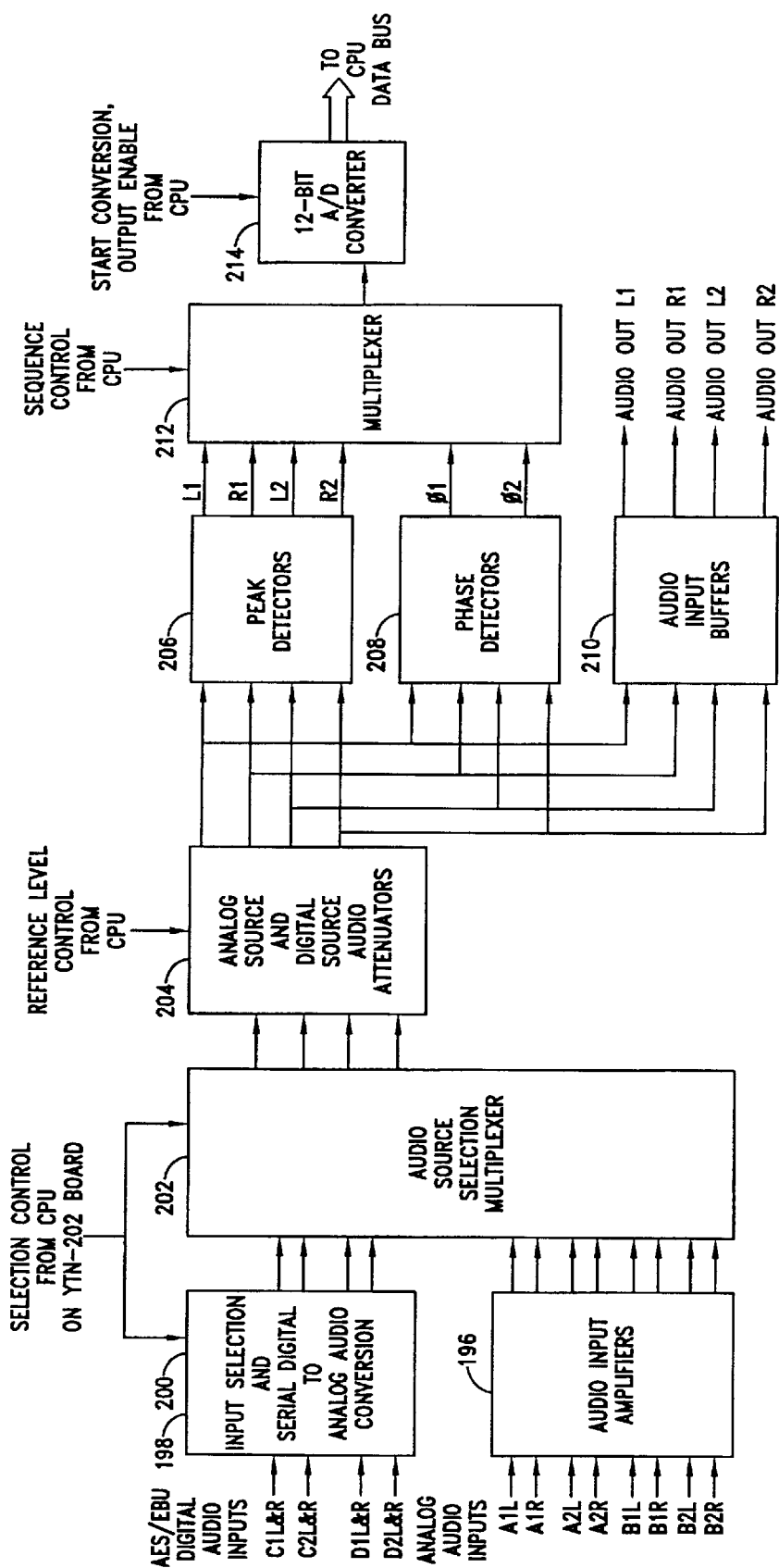

FIG. 4 shows a block diagram of the audio input circuitry, peak detector and phase detector in accordance with the invention. Analog audio inputs A1L, A1R, A2L, A2R, B1L, B1R, B2L and B2R are coupled to audio input amplifiers 196. The digital audio input signals have left and right audio multiplexed in a single signal. Accordingly, digital inputs C1L&R, C2L&R, D1L&R and D2L&R are coupled to an input selection multiplexer 198 (selected via front panel controls) and to digital to analog converters 200. Two of the four input channels (A, B, C or D) are then selected via the audio source selection multiplexer 202. The audio source selection multiplexer is coupled to attenuators 204 (selected via front panel controls). The output of the attenuators are coupled to peak detectors 206, phase detectors 208 and audio output buffers 210. The outputs of the peak detectors 206 and phase detectors 208 are coupled to multiplexer 212 and subsequently 12 bit AND converter 214. The digitized peak and phase data from the 12 bit A/D converter is coupled to the microprocessor data bus and is used by the microprocessor to generate audio bar graphs with peak signal displays as well as phase information displays.

In operation the circuitry shown in FIG. 1 processes analog and digital video inputs signals and produces red minus luminance (R-Y), blue minus luminance (B-Y), composite video (VIDORCAL) and CHROMAFIL signals for analog video inputs as well as Y, Cb, Cr, R, G, and B for digital inputs. These signals are digitized by A/D converters 90 and 92 and are subsequently used as source signals for generation of waveform and/or vector display.

The circuitry shown in FIG. 3 receives the digitized source signals and generates image information for display of the vector and waveform information under the control of microprocessor 150 generally using waveform sweep generator 166 lookup tables 162, 180 and first and second RAM banks 164 and 182. The resulting vector and image information is multiplexed through RAMDAC 192 and is combined with microprocessor-generated graticule and menu data via CPU image RAM interface 192. The microprocessor 150 is operable to read front panel controls 154, selectively control the associated circuitry and control front panel indicators 156 to provide information to the user.

Video image information is generally processed by the circuitry shown in FIG. 2 as controlled by microprocessor 150. Interlaced video image information is processed by video line doubler 100 in order to convert to non-interlaced format. If the resulting image is to be displayed in a quadrant of the SVGA monitor, the output of the video line doubler is coupled to resizing engine 102, RAM buffers 104–114 and octal registers 122–132. The resulting video image is then converted from digital to analog via triple D/A 134, filtered and multiplexed with the analog image information 194 (FIG. 3) via switch 216 as controlled by the pictime signal (from phase locked loop 120).

Audio signal processing is performed by the circuitry shown in FIG. 4 in conjunction with microprocessor 150. Digital audio input signals converted to analog and are input to audio source selection multiplexer 202. Analog input signals are amplified and are also input to audio source selection multiplexer 202. The selection of the particular audio source for generation of bar graph information is accomplished via front panel controls as controlled by microprocessor 150. User controls are also provided for optional attenuation based on front panel controls. The selected audio information is then input to peak detectors 206 and phase detectors 208 for generation of at least one peak value and phase difference value. The selected audio information (analog), peak value and phase difference value are then digitized by A/D converter 214 for input to microprocessor 150. The microprocessor then constructs audio graphic display information for display via RAMDAC 192 (FIG. 3).

The video output 218 is designed specifically to drive a super VGA (SVGA) progressive scan (i.e. non-interlaced) computer monitor at a resolution of 800 pixels per line by 600 lines per frame, at frame rates of 59.94 Hz for NTSC inputs, and 50 Hz for PAL inputs. These rates match the vertical frame rates of the respective standards. The result of using 800×600 resolution is a video and graphic display of hitherto unachieved clarity of detail for television images, rasterized waveforms, rasterized vectorscope representations, bar graph audio level meters, and the text and graticules that accompany these. Because of the widespread and increasing usage of personal computers, abundant and low cost monitors compatible with the invention are available and in accordance with the invention produce a very precise and readable display of video and audio information.

Figure 5:
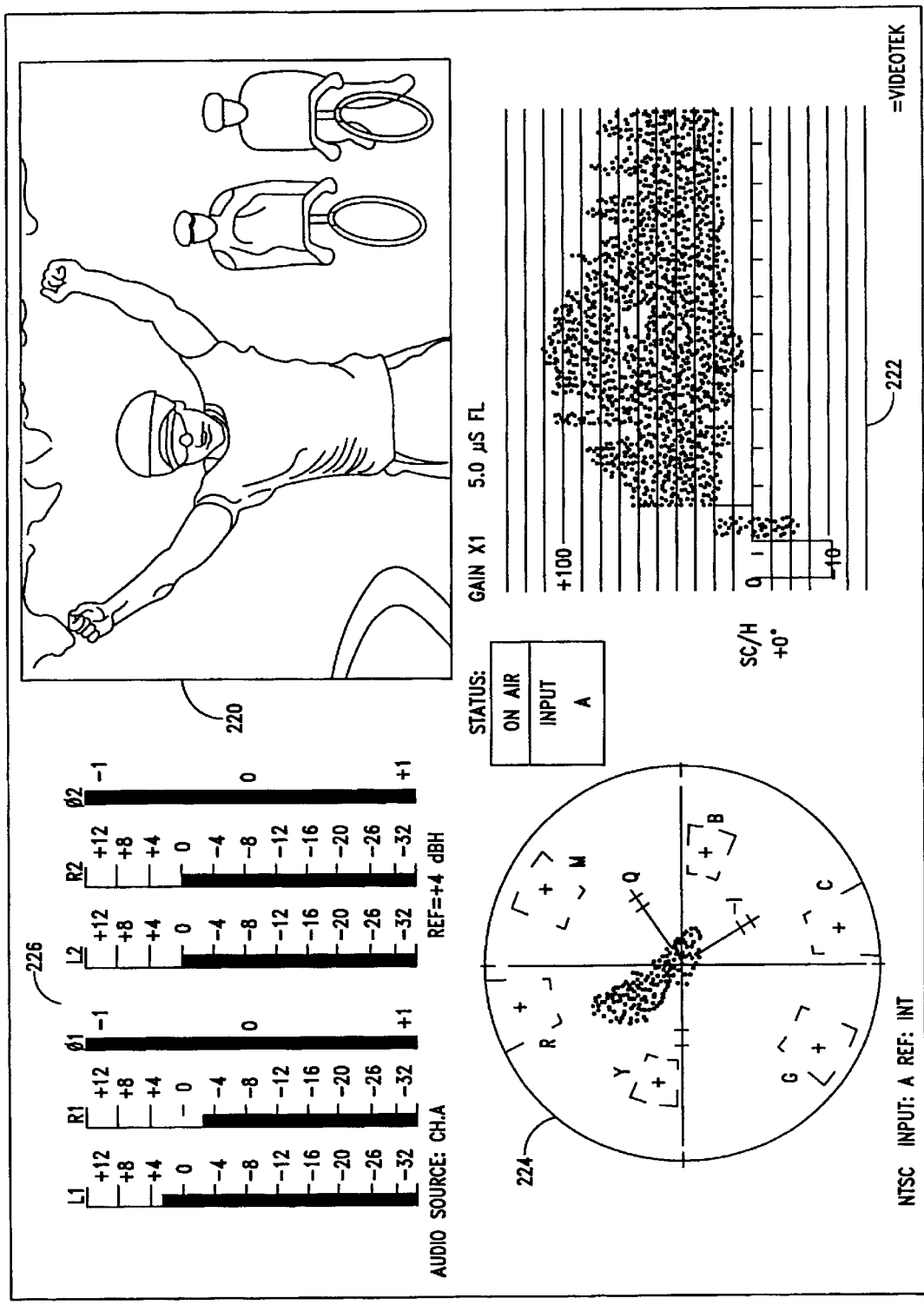
FIG. 5 is a pictorial diagram showing simultaneous display of a video image, waveform, vector and audio graphic display information in high resolution form, each in a quadrant of standard computer monitor.

FIG. 5 shows the simultaneous display of a video image, waveform, vector and audio graphic display information in high resolution form, each in a quadrant of standard computer monitor 228. In a preferred selected mode the invention displays the resized, full motion video picture 220 carried by the selected video input in the upper right quadrant of the SVGA monitor; the real time waveform 222 in the lower right quadrant including graticules and voltage level labels; the vectorscope representation of the signal 224 in the lower left quadrant including labeling and markings for a standard color bar test signal, and the audio graphic display 226 (bar graph) of the audio levels of 2 selected stereo pairs and their phase differences in the upper left quadrant. Alternatively, the user can select a full screen view of the video image, waveform, vectorscope or audio graphic display information.

For the selected waveform, the invention provides for user selection of: vertical gain of one or 2.5; zoomed displays around the 0 IRE region and around the 100 IRE region, horizontal magnification of one or five; 1 H, 2 H, 1 V, and 2 V displays; the display and identification of just one individually selected line out of the entire NTSC/PAL frame; flat, low pass, and chroma filtering of the displayed waveform; and horizontal and vertical positioning of the waveform with respect to its graticule via front panel H and V waveform position controls.

For the vectorscope display, the invention provides for user selection of: rotation of the display through 360* via a front panel VECTOR PHASE control; zoomed views of each of the four quadrants of the vector display plus a center zoomed view; for digital inputs, display of component vectors or composite vectors, for PAL, display of normal or NTSC overlaid modes; allowance for 75% and 100% color saturation; horizontal and vertical positioning of the vectorscope display with respect to its graticule; and graticules that include targets for standard color bar test patterns.

For the audio display, the invention provides for user selection of: audio level and phase difference display of 2 stereo pairs selected from among 4 input analog stereo pairs and 4 input AES/EBU standard serial digital stereo pairs; selection of one of 4 wide dynamic range measurement scales calibrated in dB; reference levels for 0 dB of 0, +4, +6, +8, and +12 dBm for analog inputs, and −22, −20, −18, and −16 dBfs for digital inputs; a display zoomed around 0 dB; and normal, peak, and peak hold displays with choice of bar graph display ballistics (equivalent to galvanometer meter damping control). The audio display preferably also utilizes colors such as green, yellow, and red in display regions on the audio level bar graphs to warn the user of excessive levels. The invention is operable to display an audio phase difference measurement based on the low pass filtered output of "exclusive-or" of hard limited audio signals.

For the entire display, the invention provides for user selection of background color, waveform color, vectorscope color, and graticule color. Front panel controls allow for user control of various display and selection modes. The invention provides an on-screen setup menu allowing the user to choose, and set values for lesser used functions and conditions.

The microprocessor automatically changes the graticules as appropriate for the display selected by the front panel controls. For NTSC/PAL inputs, a measurement of leading edge of horizontal sync to subcarrier phase (SC/H phase) also is displayed on the SVGA monitor. For serial digital video inputs, the SVGA monitor displays the presence, absence or erred condition of EDH, input signal DATA errors, and GAMUT errors in the input stream.

Additional control can be exercised through the use of a computer keyboard interface, a PC compatible RS-232 serial port, and a GPI/TALLY connector.

Figure 14:
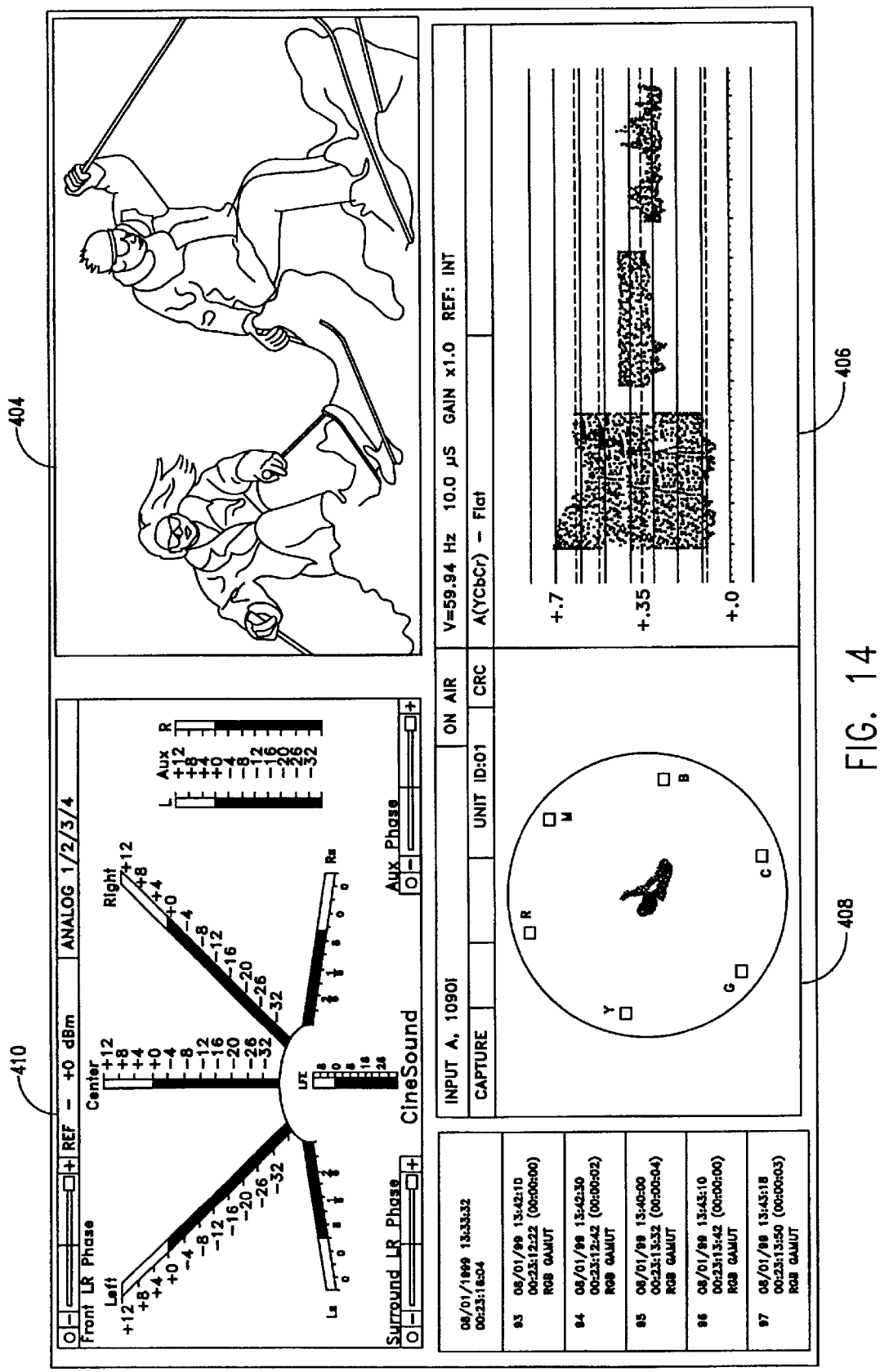
FIG. 14 is a pictorial diagram showing simultaneous display of a video image, waveform, vector and improved audio graphic display information in high resolution form, each in a quadrant of standard computer monitor in accordance with an alternate embodiment of the invention.

In an alternate embodiment, the invention provides enhanced audio display capabilities including Lissajous (audio phase display) and improved multiple channel audio graphic displays in addition to video image and waveform display capabilities (FIG. 14). Lissajous displays are particularly useful in measuring channel separation (e.g., between left and right audio channels). An improved multiple channel bar graph is also provided. This type of display simultaneously shows the relative amplitude of all channels of an audio surround sound signal (e.g., 5.1 or 6.1).

The invention is compatible with a wide range of surround sound formats such as AC-3 (i.e., DOLBY DIGITAL or 5.1) which provides six separate audio channels. The left, center and right channels generally provide audio information imaged in front of the listener and provide positioning of dialogue. Separate or "discrete" left and right surround channels are generally provide audio information imaged on the side and/or behind the listener to provide atmospherics and ambient sounds. A separate subwoofer/bass effects channel adds an extra punch to action and special effects sequences. Other surround formats including 7.1 formats are also compatible with the invention.

Figure 6:
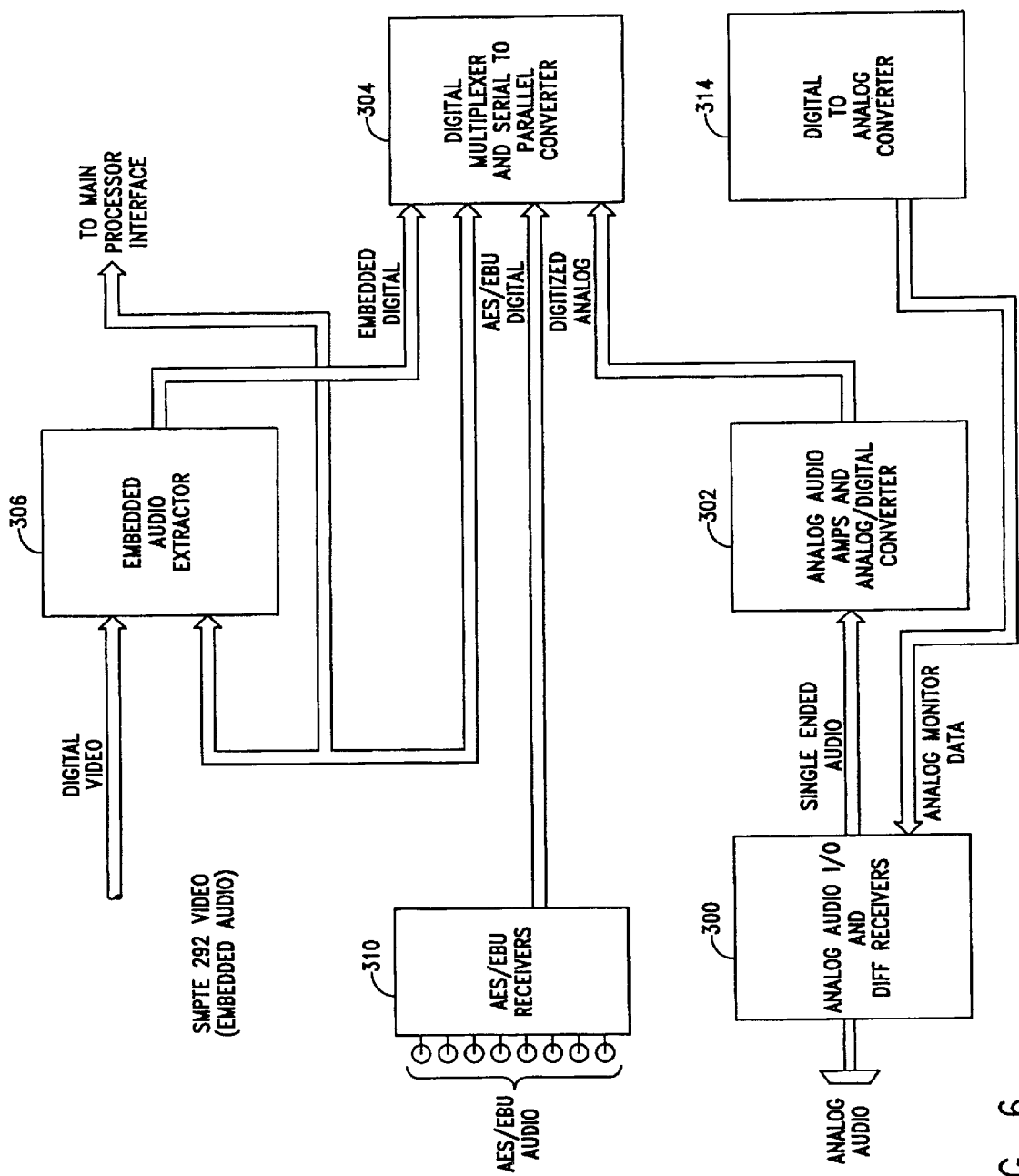
FIG. 6 is a block diagram of a portion of the audio input circuitry showing the embedded audio, AES/EBU audio and analog audio input in accordance with an alternate embodiment of the invention.
Figure 7:
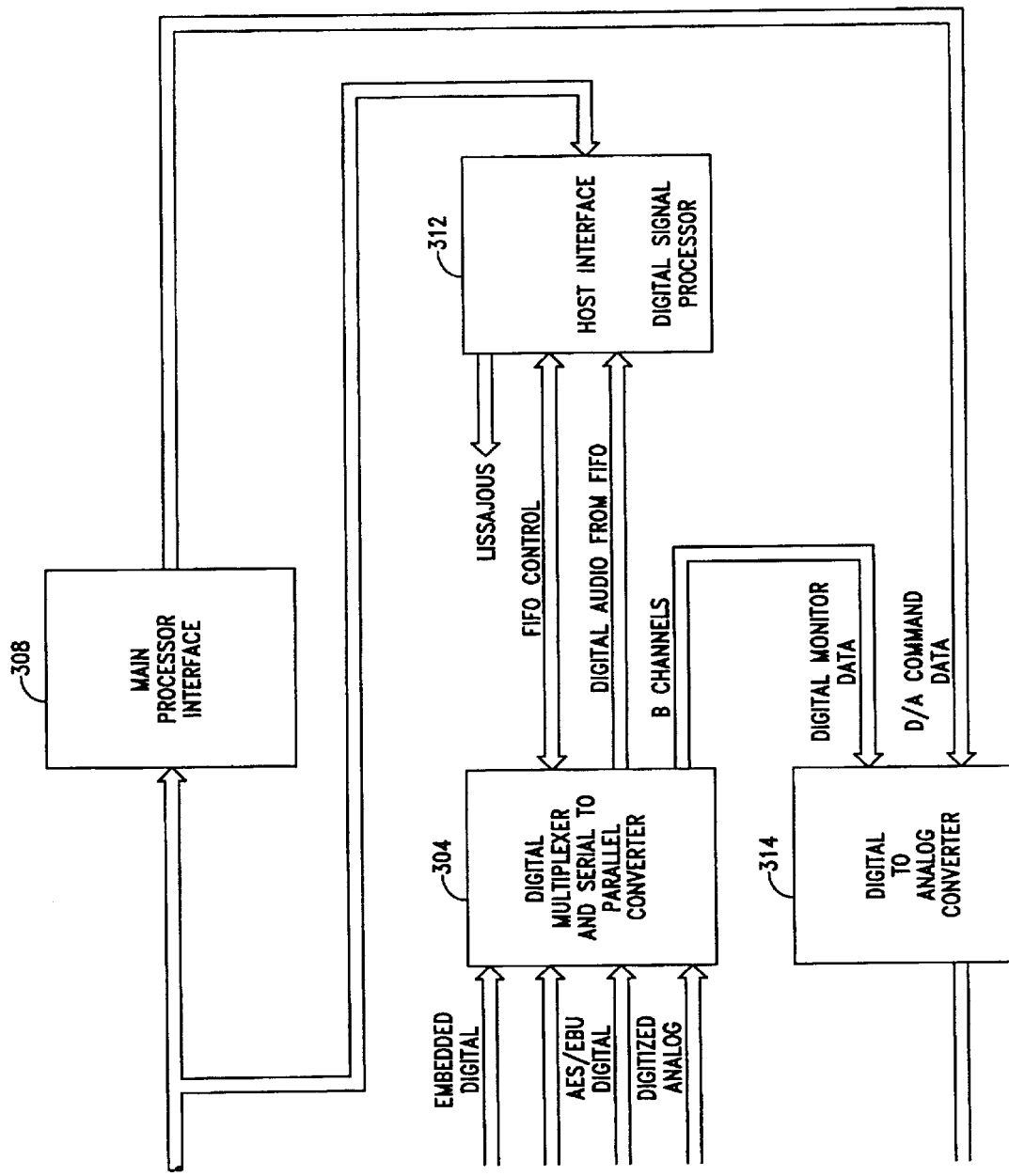
FIG. 7 is a block diagram showing a portion of the audio input circuitry showing the serial to parallel convertor and digital signal processor in accordance with FIG. 6.

FIGS. 6 and 7 show a block diagram of the audio input circuitry in accordance with the invention. Three types of audio inputs are provided and accept: embedded audio (derived from SMPTE 292M digital video data inputs); AES/EBU audio and analog audio signals. User controls (not shown) are provided for selecting one of the three types of audio input signals for processing and generation of an audio graphic display and/or Lissajous. Embedded audio data and analog audio signals are first converted into a serial digital data streams (e.g., AES/EBU format) and are ultimately routed to the digital signal processor and main processor for further processing and display.

It is understood that the term "user control" as used herein refers to any form of user controlled input signaling means (e.g., toggle switch, push button, touch screen input, or remote control software command). User controls are generally used herein to allow the user to select between various inputs, output formats, filters, gain parameters and the like.

As show in FIG. 6, analog audio signals (differential) are coupled to a differential audio receivers as shown generally by block 300. It is understood that multiple analog audio inputs are provided, each having an associated differential receiver which converts the differential audio into a single ended audio signal. The single ended audio signal is coupled to an analog amplifier and analog to digital convertor 302 for conversion into a serial data stream. The serial data stream (digitized analog) is coupled to an input of digital multiplexer and serial to parallel convertor 304.

Embedded audio information is extracted using an embedded audio extractor 306 conforming to the SMPTE 299M standard. The output of the embedded audio extractor (embedded digital) is coupled to an input of digital multiplexer and serial to parallel convertor 304. The embedded audio extractor and digital multiplexor and serial to parallel convertor are coupled to, and at least partially controlled by, the main processor 308.

AES/EBU (i.e., serial) audio signals are coupled to AES/EBU receivers 310 each having output (AES/EBU digital) which is fed directly into an input of digital multiplexor and digital to parallel convertor 304. Thus, the digitized analog and embedded digital signals are essentially identical in format as the AES/EBU digital signal. Digital multiplexor and digital to parallel convertor 304 is responsive to user control (not shown) such that a the user selected signal type is subsequently output by the digital multiplexor and digital to parallel convertor 304.

FIG. 7 (a continuation of FIG. 6) shows the digitized analog, embedded digital and AES/EBU digital signals coupled to inputs of the digital multiplexor and serial to parallel convertor 304. Responsive to user controls (not shown), digital multiplexor and serial to parallel convertor 304 selects one of the digitized analog, embedded digital and AES/EBU digital signals and converts the selected signal to parallel data (digital audio from FIFO). The output of the digital multiplexor and serial to parallel convertor 304 is coupled to digital signal processor 312 and ultimately to a RAMDAC for display on a conventional computer monitor. The function of the digital signal processor will be discussed in more detailed below.

In general, the digital signal processor performs two functions, generation of Lissajous (audio phase display) data and generation of audio graphic display (VU meter) data. The numerical calculation of an audio Lissajous pattern (audio phase) is performed by generally known and conventional means using standardized algorithms. The Lissajous data is then ultimately loaded into the RAMDAC and output on the standard computer monitor. Similarly, the audio graphic display data (for VU or PPM meter) is calculated using conventional techniques. In general, the audio graphic display is a bar graph which simulates a galvanometer or voltmeter with standardized dB calibration for measuring audio signal levels. A VU meter (or audio graphic display of a VU meter) has an attack and overshoot (i.e., needle ballistics) optimized for broadcast and sound recording. VU meter characteristics are defined by ANSI specification "Volume Measurements of Electrical Speech and Program waves," C16.5-1942. In general, 0 VU is defined to be a level of +4 dBu for an applied sine wave. The VU meter has relatively slow response. It is driven from a full-wave averaging circuit defined to reach 99% full-scale deflection in 300 ms and overshoot not less than 1% and not more than 1.5%. Since a VU meter is optimized for perceived loudness it is not a good indicator of peak performance.

The invention can also produce an audio graphic display calibrated as a peak program meter (PPM). In general, the PPM augments the VU meter and both are often used in modern recording studios. The PPM is particularly valuable for digital audio recording or signal processing due to the critical monitoring required to prevent exceeding 0 dBFS and reducing saturation or clipping of audio signals. There are several different PPM specifications, but no one universal standard; although the German DIN specification 45406 functions somewhat as a de facto standard. An interesting aspect of PPM design is that rather than respond instantaneously to peaks, PPMs require a finite integration time so that only peaks wide enough to be audible are displayed. DIN 45406 translates this into a response that is 1 dB down from steady-state for a 10 ms tone burst, and 4 dB down for a 3 ms tone burst (this is consistent with the other commonly seen specification of 2 dB down for a 5 ms burst—both requirements. are satisfied by an attack time constant of 1.7 ms (BBC requirement is 2.5 ms). The specified decay rate of 1.5 seconds to a −20 dB level can be met with a 650 ms time constant. The VU or PPM data for the audio graphic display is selectable by user control (not shown) and is ultimately stored in the CPU Graphics Processor 398 (i.e., third RAM bank) and subsequently loaded into the RAMDAC and output on the standard computer monitor.

The invention also provides a loop back path for generation of an analog audio signal based on the selected signal (output by the digital multiplexer and serial to parallel convertor 304). An output of the digital multiplexer and serial to parallel convertor 304 is coupled to digital to analog convertor 314 and converted back to an analog signal. The output of the digital analog convertor 314 is coupled to an output jack (not shown) and can be used for diagnostic and testing purposes.

Figure 8:
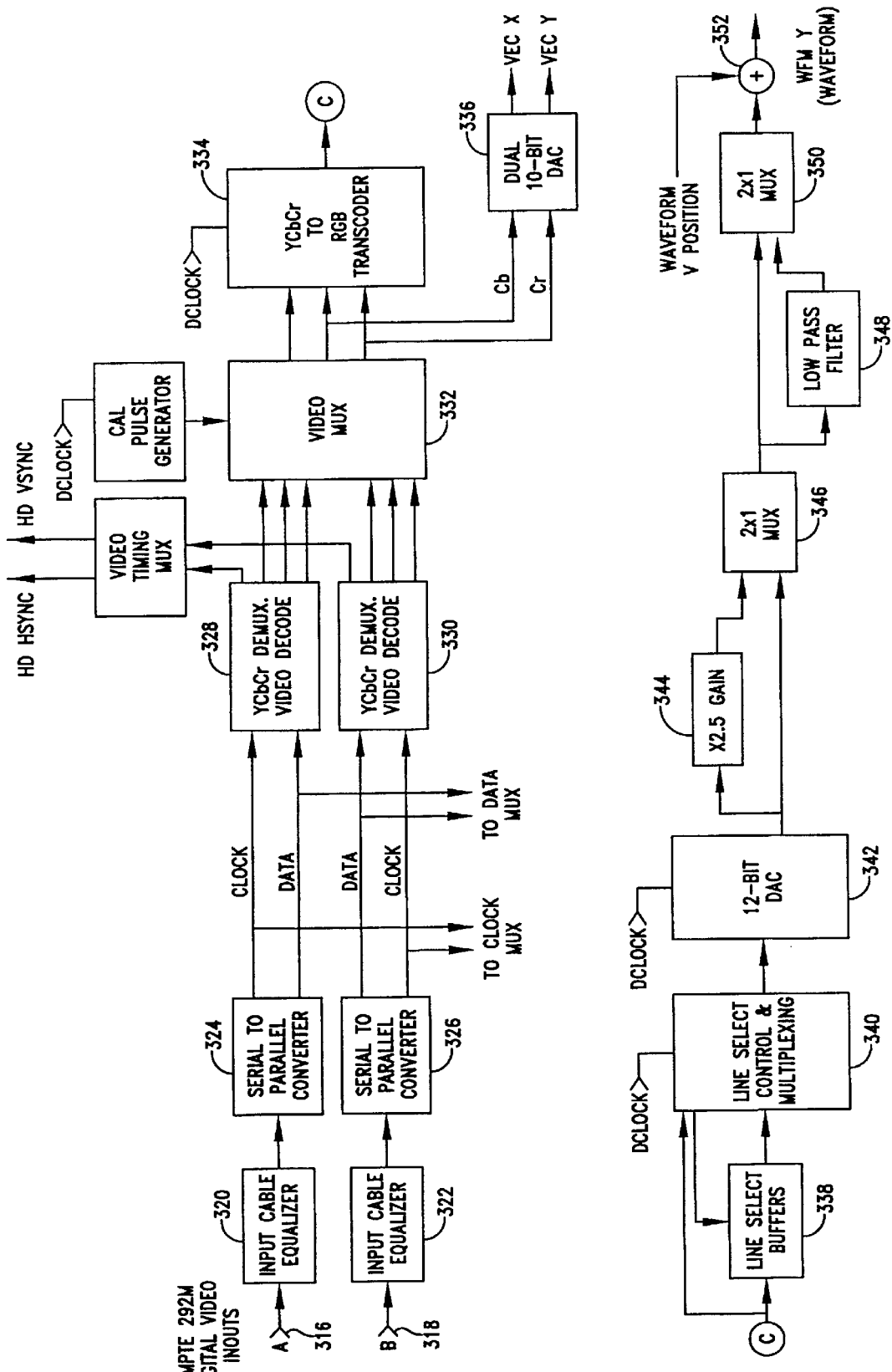
FIG. 8 is a block diagram showing the video input circuitry showing two digital video inputs and generating video wave form information in accordance with an alternate embodiment of the invention.

FIG. 8 shows a block diagram of the digital input circuitry for, SMPTE 292M digital video input signals and for generating video waveform information. Two identical inputs; 316 and 318 are provided for digital video input signals, A and B, respectively. Inputs 316, and 318 are individually selectable via a video multiplexer responsive to user control (not shown). SMPTE 292M digital video input signals are in YCbCr format. A transcoder is provided for optional conversion to, and subsequent display of, RGB format video waveform information. A user control (not show) is provided for selection between YCbCr and RGB format.

The digital video input signals are coupled to input cable equalizers 320, 322 which compensate for signal loss due to cable length. The equalized video input data is coupled to serial to parallel convertors 324, 326 which derive separate video clock and video data signals for each input. The video clock and video data signals are coupled to YCbCr demultiplexers and video decoders 328, 330 which demultiplex the Y, Cb and Cr components of the digital video signal (in accordance with SMPTE 292M). The video clock and video data signals are also coupled to a clock MUX and data MUX, respectively, for subsequent scaling and output as video image information. The video clock signals are also routed to a DClock multiplexer (not shown) which generates the DClock signal based on the user selected video input signal (A or B). The DClock signal is simply the clock signal for the selected video input signal (A or B) and generally is as a clock signal for the YCbCr to RGB transcoder 334, line select control and multiplexer 340 and 12 bit DAC 342.

The output of YCbCr demultiplexers and video decoders 328, 330 are input to a video multiplexor 332. The output of the video multiplexor 332 is selected by a user control. (not shown) such that digital video data from input signal A or B is coupled to the multiplexer output. The output of the video multiplexor is coupled to a YCbCr to RGB transcoder 334 and is further processed for generation of video waveform information. The Cb and Cr outputs of the video multiplexor 332 are coupled to Dual 10 Bit DAC 336 which generates signals VEC X and VEC Y, which represent video vector information and are subsequently processed into a video vector display.

As is generally known in the art, transcoder is basically a matrix multiplier. The transcoder is coupled to the main processor which is operable to initialize the transcoder with a plurality of numerical coefficients to convert the YCbCr decoded video information to RGB or otherwise manipulate the YCbCr components if desired. As shown in FIG. 8, the video multiplexer 332 outputs separate representations of the Y, Cb and Cr components of the digital video input signal. The R, G and B components of a corresponding RGB signal are mathematically related to and can be derived from the luminance and chroma components of the YCbCr signal. In operation, the main processor is operable to load the transcoder with the desired coefficients prior to cross multiplication. In general, the desired coefficients are dependant on the format of the video input signal and are selected in accordance with SMPTE 240M and SMPTE 274M.

Aside from converting YCbCr data to RGB data, the transcoder coefficients can be set to the value one, and the output of the transcoder will be simply YCbCr data. Further, the transcoder can be loaded with combinations of coefficients of ones and zeros such that the individual components Y, Cb and Cr are isolated for later display individually.

The output of the YCbCr to RGB transcoder 334 (shown at C) is coupled to the input of the line select buffers 338 and is subsequently input to line select control and multiplexer 340. The line select control and multiplexer 340 is responsive to user controls (not shown) via the main processor to isolate a particular line of the video signal. Thus, the line select control and multiplexer allows the user to select and isolate a particular line of the video input, A or B, for further display. In the alternative, the line select control and multiplexer 340 can be disabled so that the entire video waveform is subsequently displayed. The output of the line select control and multiplexer 340 is coupled to 12 Bit DAC 342 which generates an video waveform signal. User controls (not shown) allow the user to select a 2.5 gain (see blocks 344 and 346) and/or a low pass filter (see blocks 348 and 350) for application to the video waveform signal. User controls (not shown) also provide for a vertical waveform positioning as shown by summing amplifier 352. The output of the summing amplifier WFM Y represents the video waveform information and is subsequently further processed for display.

Figure 9:
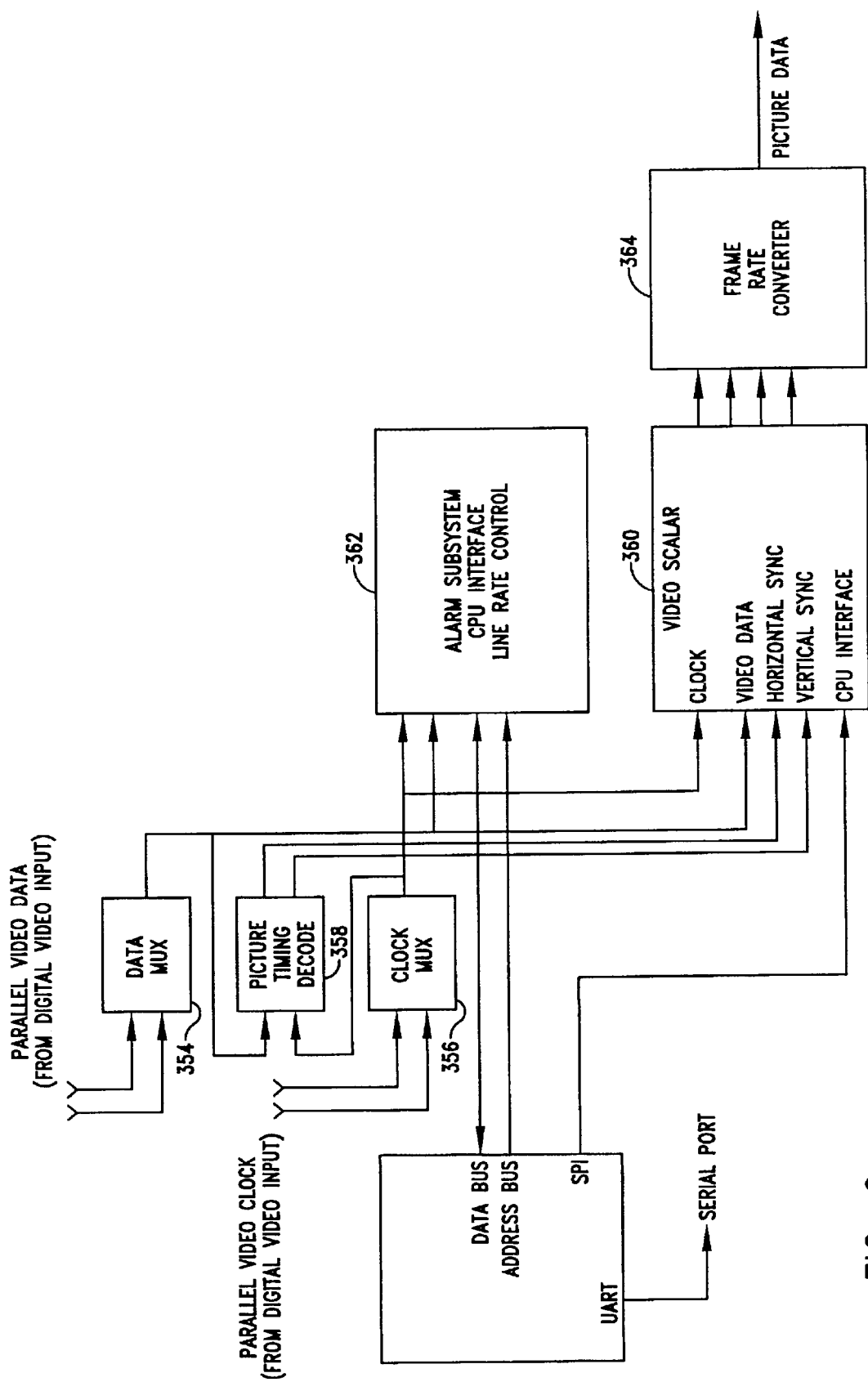
FIG. 9 is a block diagram showing the circuitry for force scaling video image information for display in a quadrant of a standard computer monitor in accordance with an alternate embodiment of the invention.

As shown in FIG. 9, the digital video input data and clock signals (derived from input signals A and B—see FIG. 8) are coupled to data and clock multiplexers 354, 356 which are selected by a user control (not shown) to select either the A or B digital video input. The selected data and clock signals are routed to a picture timing decoder 358 which generates the horizontal and vertical sync signals. The selected data and clock signals as well as horizontal and vertical sync signals are input to video scaler 360. The main processor is operable to select the desired scaling of the digital video input signal. For example, the selected digital video input signal can be displayed in ¼ screen or full screen format.

In general a video scaler is operable to produce a video image in a wide range of resolutions and refresh rates. Independent of the original incoming video format. Like line doublers and quadroopers, a video scaler combines the information in the odd and even fields of an incoming video signal into a combined non-interlaced picture. Then, the video scaler uses various processing algorithms to manipulate the image to change its resolution, refresh rate and aspect ratio to match the desired output specifications. Video scaling essentially eliminates the limitations imposed by line doubling and quadrooping technology. Thus any resolution can be achieved by loading the proper command words into the video scaler to select the desired output. Video scaling circuits for use in accordance with the invention are commonly available from a variety of manufacturers. In the present embodiment, the main processor is operable to load the video scaler 360 with the appropriate command words depending on whether a ¼ screen or full screen image. It is understood that virtually any size video image can be produced. The output of the video scalar 360 is coupled to an input of frame rate converter 364 which generates video image data (PICTURE DATA) in progressive for display on a standard computer monitor.

An alarm sub system and line rate control 362 is coupled to the main processor 308 as well as the selected clock and data signals. Alarm sub system and line rate control 362 monitors the input levels, RGB gamut and the like and generates alarm signals (if necessary) responsive to the selected video input signal (A or B).

Figure 10:
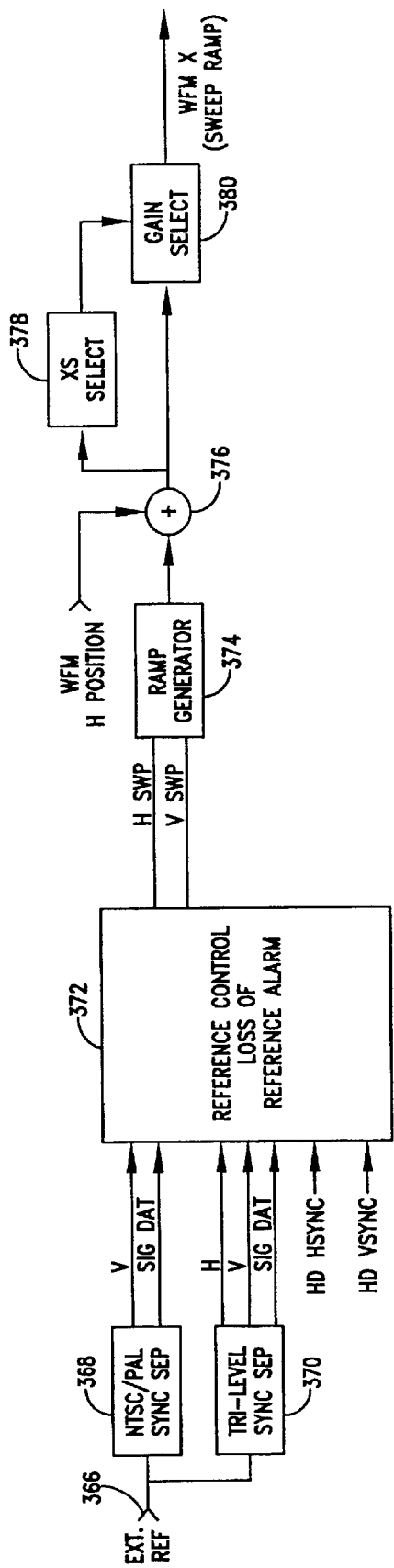
FIG. 10 is a block diagram showing the external reference signal circuitry in accordance with an alternate embodiment of the invention.

FIG. 10 shows a block diagram of the circuitry for processing an external reference input. The external reference input 366 is operable to accept NTSC/PAL (analog) video signals as well as high definition tri-level sync signals. Sync separators 368, 370 separate the required sync signals. The type of signal is selected via a user control (not shown). The selected signal, sync signals, HD Hsync and HD Vsync signals are input to a reference control and loss of reference alarm circuit 372 which generates horizontal and vertical sweep signals H SWP and V SWP and, if necessary, a loss of reference alarm signal. The H SWP and V SWP signals are input to a ramp generator 374. The output of the ramp generator is coupled to summing amplifier 376 which is used to set the horizontal position of the waveform responsive to user control (not shown). A user control is also provided for selecting 5× gain (see blocks 378, 380) and the sweep ramp (WFM X) is subsequently output for further processing and synchronizing of the video signals.

Figure 11:
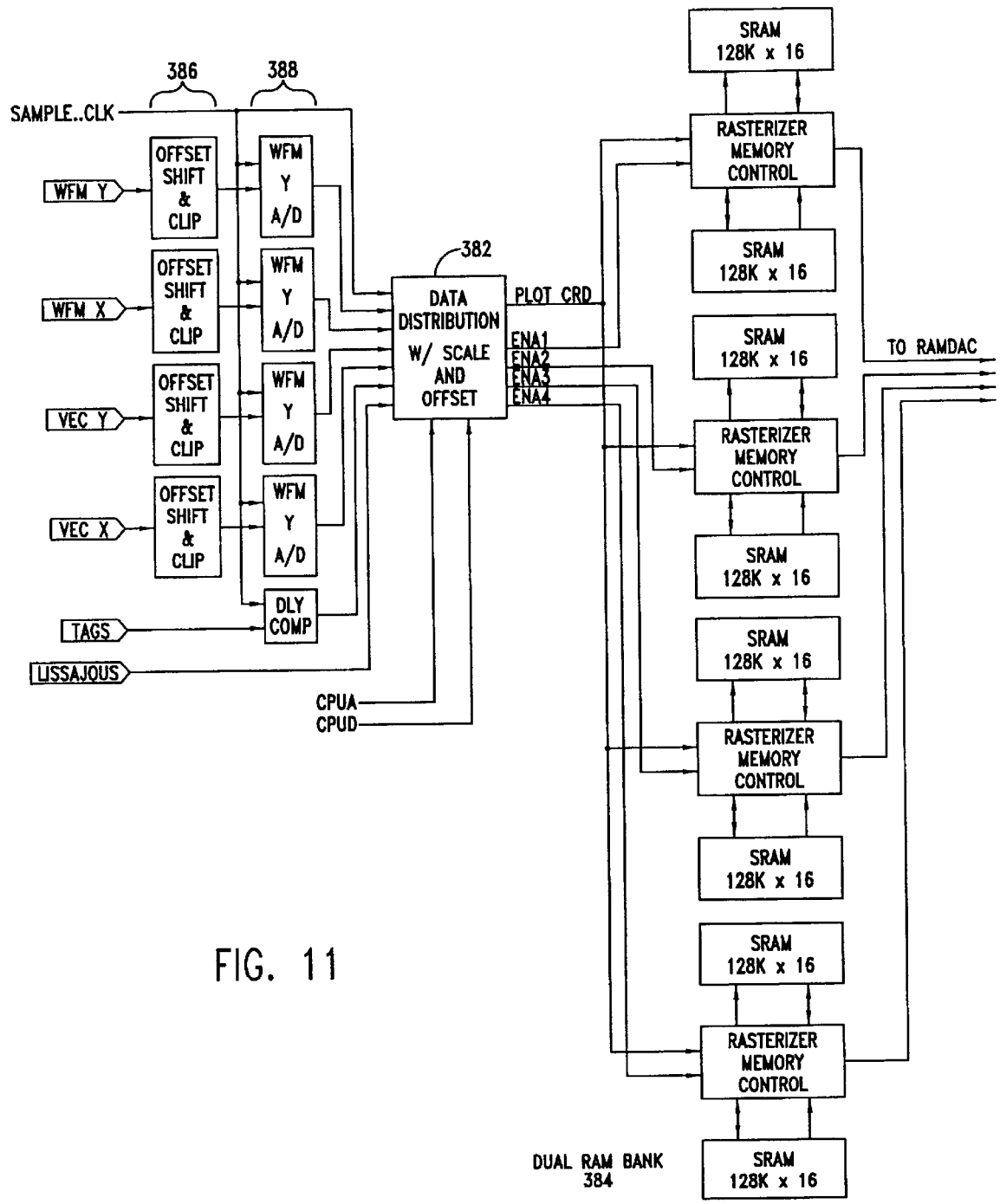
FIG. 11 is a block diagram of a dated distributor and dual ram bank for storing wave form, vector and Lissajous data for output to the RAMDAC, in accordance with an alternate embodiment of the invention.
Figure 12:
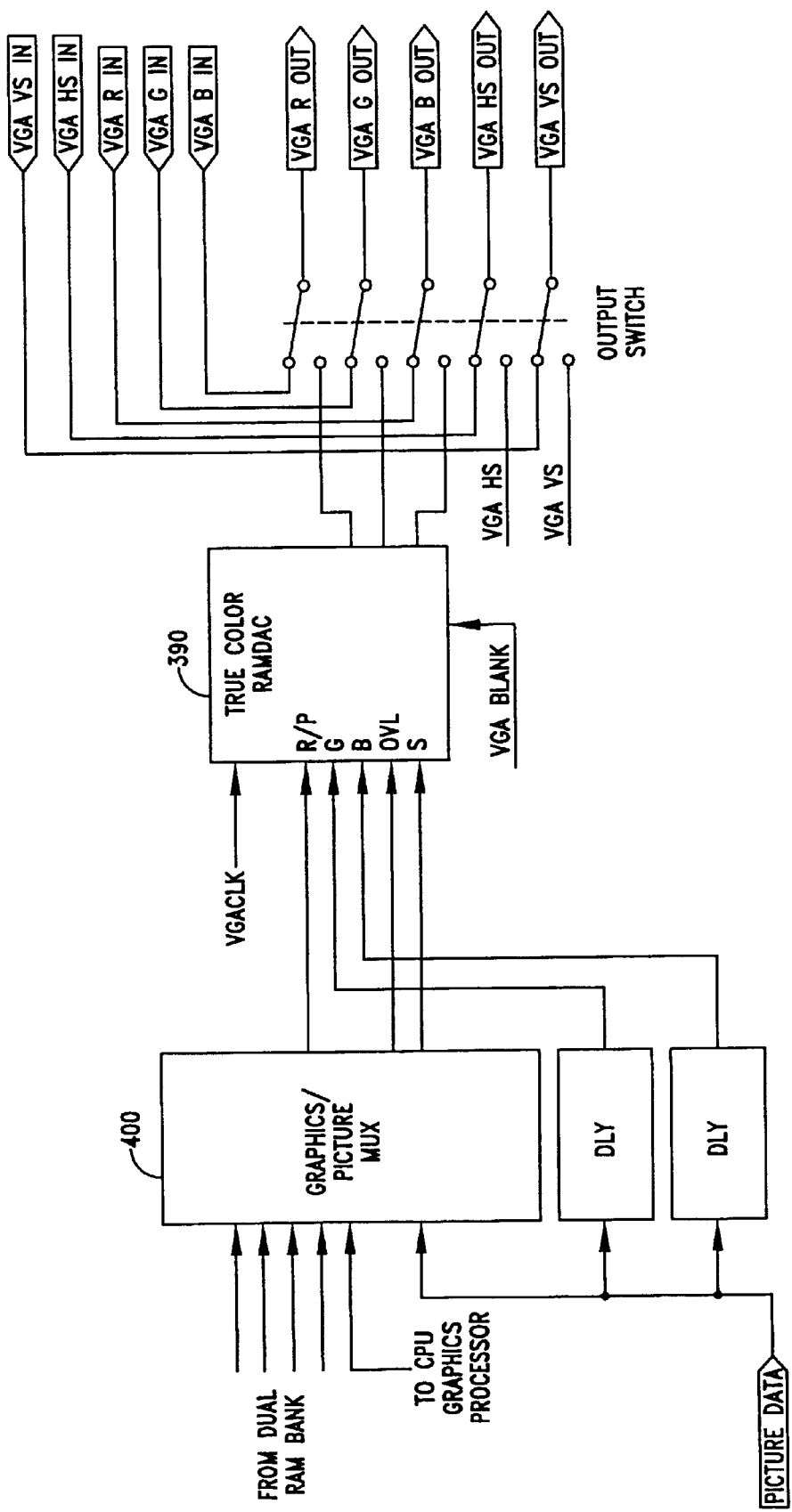
FIG. 12 is a block diagram showing the graphics picture MUX, RAMDAC and output switch for a simultaneous display of video image, wave form, vector and audio graphic display information in high resolution format, each in a quadrant of a standard computer monitor in accordance with an alternate embodiment of the invention.

FIG. 11 shows a block diagram of the data distributor 382 and dual RAM bank 384 which ultimately stores the digitized representations of the video waveform vector and Lissajous signals generated by circuitry previously discussed. The WFM Y, WFM X, VEC Y and VEC X signals are coupled to offset shift and clip circuits 386 and are then converted to digital signals by A/D converters 388. The Lissajous signal, generated by the digital signal processor 312, is already in digital form and is directly input to the data distributor 382. The waveform, vector and Lissajous data is then selectively routed to individual sections of the dual RAM bank 384 which is subsequently coupled to the RAMDAC 390 as shown in FIG. 12. The PICTURE DATA signal (FIG. 9) as well as the output from the dual RAM bank are coupled to graphics picture MUX 400 and then coupled to RAMDAC. The output of the RAMDAC is coupled to an output switch which is selectable via user controls (not shown). The output switch allows for optional viewing of an externally generated video (e.g., SVGA, XGA . . . ) signal. If selected, the output of the RAMDAC is subsequently output as a video signal for viewing on a standard computer video image in progressive scan format (i.e., SVGA, XGA . . . ).

Figure 13:
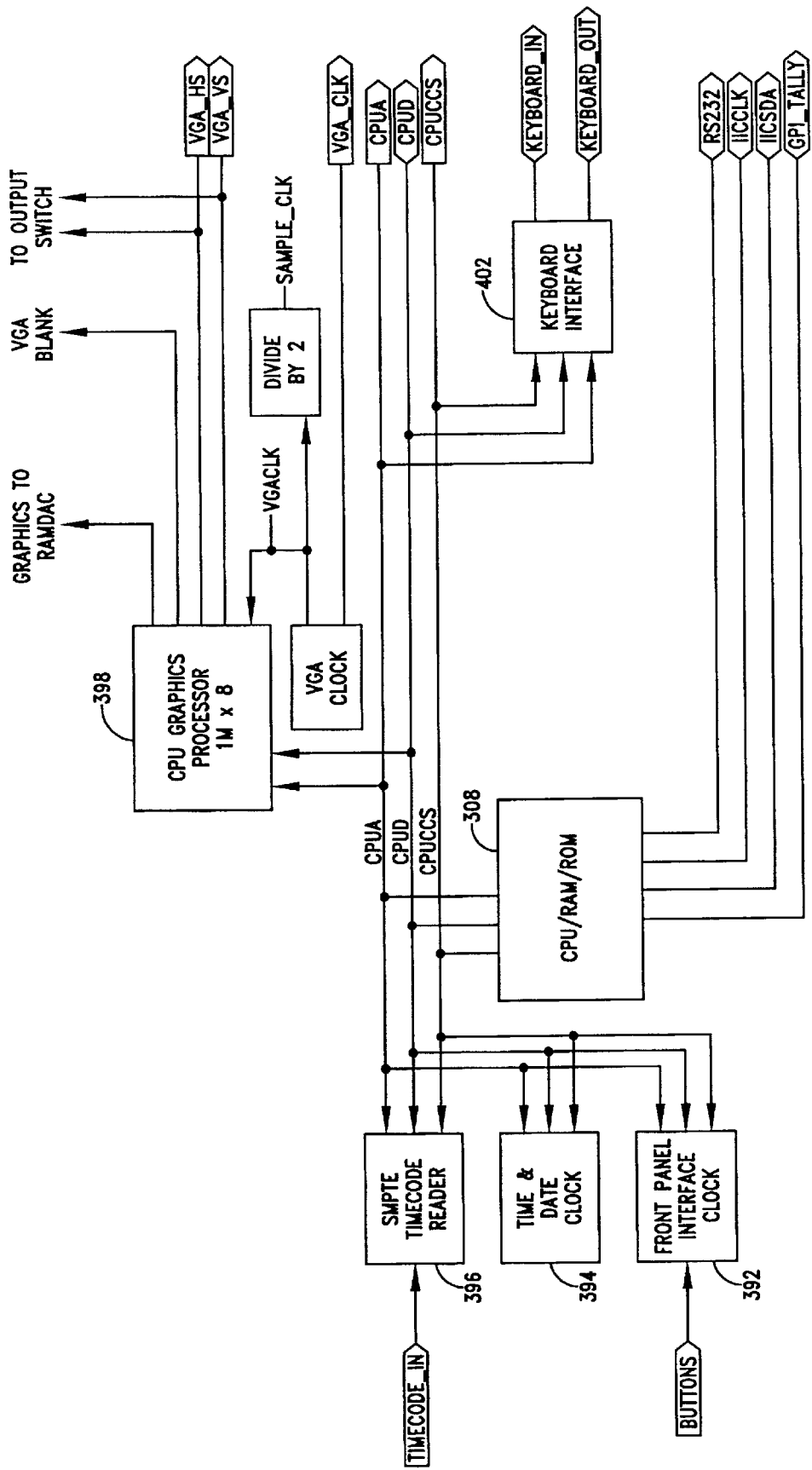
FIG. 13 is a block diagram showing the main processor, CPU graphics processor and various interfaces in accordance with an alternate embodiment of the invention.

FIG. 13 shows the front panel interface 392, time & data clock 394 and SMPTE Timecode reader 396 and keyboard interface 402, which are coupled to the main processor 308. CPU graphics processor 398 creates a video image of a third RAM bank containing graphics information (such as such as graticule, audio graphic display, messages and other line and text based information from the main processor and/or DSP) which is coupled to the input of the graphics picture MUX 400. CPU graphics processor 398 generally comprises a RAM bank and state machine for outputting digital component video for combination with data routed to the RAMDAC. Various other signals are also generated by the CPU graphics processor such as the VGA HS and VGAVS (horizontal an vertical sync) signals as shown.

FIG. 14 shows the simultaneous display of a video image, waveform, vector and audio graphic display information in high resolution form, each in a quadrant of standard computer monitor. In a preferred selected mode the invention displays the resized, full motion video picture 404 carried by the selected video input in the upper right quadrant of an XGA computer monitor; the real time waveform 406 in the lower right quadrant including graticules and voltage level labels; the vectorscope representation 408 the selected video signal in the lower left quadrant (approximately) including labeling and markings for a standard color bar test signal, and the audio graphic display 410 (bar graph) of the audio levels of 5.1 surround sound signal and the associated phase differences. Alternatively, the user can select a full screen view of the video image, waveform, vectorscope, Lissajous or audio graphic display information.

In general, the invention supports 720p, 1080i, and 1080 and 1080p/24sf serial digital input formats; audio display for 5.1 or 7.1 channels of input audio display and monitoring.

VGA (1024×768) output; Display aspect ratio of either 4:3 or 16:9 (using rectangular pixels); A-B parade/overlay inputs (synchronous and same format) and filters; Timecode input (LTC and VANC) with on screen display; Internal on screen clock with ability to be set from input Timecode; Adjustable alarm limits; On screen measurement cursors; GPI for alarms; On screen alarm log—downloadable; Analog, AES/EBU and embedded audio inputs with analog monitoring; Frame Capture with selection of modes—B&W and/or Color; 8 Analog, AES/EBU and embedded audio inputs.

For the audio graphic display, the invention provides for user selection of the three types of audio inputs (analog, embedded and AES/EBU) and displays the audio level and associated surround LR phase and Aux phase; user selection of one of 4 wide dynamic range measurement scales calibrated in dB; reference levels for 0 dB of 0, +4, +6, +8, and +12 dBm for analog inputs, and −22, −20, −18, and −16 dBfs for digital inputs; a display zoomed around 0 dB; and normal VU, peak, and peak hold displays with choice of bar graph display ballistics (equivalent to galvanometer meter damping control). The audio display preferably also utilizes colors such as green, yellow, and red in display regions on the audio level bar graphs to warn the user of excessive levels. The invention is operable to display an audio phase Lissajous (similar to the video vector image as shown).

For the entire display, the invention provides for user selection of background color, waveform color, vectorscope color, and graticule color. Front panel controls allow for user control of various display and selection modes. The invention provides an on-screen setup menu allowing the user to choose, and set values for lesser used functions and conditions.

The main processor automatically changes the graticules and text information as appropriate for the display selected by the user controls. For digital video inputs, the video monitor displays the presence, absence or erred condition of CRC calculation, GAMUT errors in the input stream and loss of video signal.

Additional control can be exercised through the use of a computer keyboard interface, a PC compatible RS-232 serial port, and a GPI/TALLY connector.

Advantages of the Invention

Numerous advantages are provided by employing the present invention, a non-exhaustive list is disclosed below. The present invention provides an audio-video processor operable to display video images, waveform, vector and audio information in high resolution form, preferably simultaneously in quadrants of a standard computer monitor display. The invention also provides an audio-video processor operable to display video images, waveform, vector and audio information on a standard computer monitor without the need for processing the data by computer, and at high resolution and high data rate. The invention further provides an audio-video processor operable to digitize composite video signals utilizing 24-bit color representation (16,777,216 colors) and to display the digitized video signal on a standard SVGA computer monitor in full screen, full motion 640 pixel per line by 480 line per frame format. The invention further provides an audio-video processor operable to digitize composite video signals utilizing 24-bit color representation (16,777,216 colors) and to display the digitized video signal on a standard XGA computer monitor in full screen, full motion 1024 pixel per line by 768 line per frame format. The invention further provides an audio-video processor operable to display waveforms, vectorscope and audio graphic display information on a standard SVGA computer monitor in full screen format. The invention further provides an audio-video processor operable to display waveforms, vectorscope and audio graphic display information on a standard XGA computer monitor in full screen format. The invention further provides an audio-video processor operable to digitize composite video signals utilizing 24-bit color representation and to display the digitized video signal in one quadrant of a standard SVGA computer monitor (800 by 600 pixels) in full motion 400 pixel per line by 300 line per frame format. The invention further provides an audio-video processor operable to digitize composite video signals utilizing 24-bit color representation and to display the digitized video signal in one quadrant of a standard XGA computer monitor (1024 by 768 pixels) in full motion 512 pixel per line by 384 line per frame format (approximately). The invention further provides an audio-video processor operable to digitize and represent a video signal, waveform, vector and audio graphic display information such as a bar graph on a standard SVGA computer monitor each displayed in a quadrant of the standard SVGA computer monitor. The invention further provides an audio-video processor operable to digitize and represent a video signal, waveform, vector and audio graphic display information such as a bar graph on a standard XGA computer monitor each displayed in a quadrant of the standard XGA computer monitor. These and other advantages are readily apparent, the scope of the invention as claimed is by no means limited to or by the precise advantages recited above.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A signal processor for use with a standard non-interlaced computer monitor comprising:
   at least one video input for receiving a video input signal in at least one of an analog format and a digital format;
   at least one audio input for receiving an audio input signal in at least one of an analog format and a digital format;
   means for generating a resized non-interlaced video image based on the video input signal;
   means for generating a graphic video waveform and a vector diagram based on the video input signal;
   means for generating an audio graphic display and audio phase diagram based on the audio input signal; and
   means for generating an output for simultaneously displaying at least two of the resized non-interlaced video image, graphic video waveform, vector diagram, audio graphic display and audio phase diagram in progressive scan format, each in a portion of the standard non-interlaced computer monitor.

2. The signal processor of claim 1 comprising a dedicated digital main processor and associated RAM, ROM and control logic, a dual RAM bank in communication with the main processor for storing information representing at least one of the graphic video waveform, vector diagram, audio graphic display and audio phase diagram, the digital processor being operable to control the outputting of information stored in the dual RAM bank for output of the graphic video waveform, vector diagram, audio graphic display and audio phase diagram on the standard non-interlaced computer monitor.

3. The signal processor of claim 1 wherein the means for generating the graphic video waveform and vector diagram comprises a serial to parallel converter coupled to a YCbCr demultiplexer and video decoder.

4. The signal processor of claim 1 wherein the means for generating the resized non-interlaced video image comprises a serial to parallel converter coupled to a YCbCr demultiplexer and video decoder coupled to a picture scalar coupled to a frame rate converter.

5. The signal processor of claim 2 further comprising a DSP coupled to the main processor, wherein the means for generating the audio graphic display comprises a digital multiplexer and serial to parallel converter coupled to the DSP.

6. The signal processor of claim 5 wherein the audio input signal is an analog surround sound input signal having at least a left, right, center, left rear, right rear and subwoofer channel, and the means for generating the audio graphic display further comprising a plurality of differential receivers coupled to a plurality of audio amplifiers coupled to a plurality of analog audio analog to digital converters.

7. The signal processor of claim 5 wherein the audio input signal is an embedded in a digital video signal, the audio input signal having at least a left, right, center, left rear, right rear and subwoofer channel, and the means for generating the audio graphic display further comprising an embedded audio extractor.

8. The signal processor of claim 1 wherein the audio signal processor is operable to simultaneously display the resized non-interlaced video image, graphic video waveform, vector display and audio graphic display in progressive scan format, each in a quadrant of the standard non-interlaced computer monitor.

9. The signal processor of claim 1 wherein the audio signal processor is operable to simultaneously display the resized non-interlaced video image, graphic video waveform, vector display and audio phase display in progressive scan format, each in a quadrant of the standard non-interlaced computer monitor.

10. The signal processor of claim 2 further comprising a CPU graphics processor in communication with the main processor for storing data representing graticule information, audio graphic display information and menu information, the digital processor being in communication with the means for generating the resized non-interlaced video image and being operable to control the outputting of information stored in the a RAM bank in the CPU graphics processor, for simultaneous display of the resized non-interlaced video image, graphic video waveform, vector diagram, audio graphic display, graticule information and menu information in progressive scan format, each in a quadrant of the standard non-interlaced computer monitor.

* * * * *